Jan. 3, 1939.     R. M. HICKS     2,142,691
TRANSMITTER AND CODE TRANSLATOR
Original Filed May 7, 1931     17 Sheets-Sheet 3

INVENTOR
Raymond M. Hicks
BY
M. J. Reynolds
ATTORNEY

Jan. 3, 1939.    R. M. HICKS    2,142,691
TRANSMITTER AND CODE TRANSLATOR
Original Filed May 7, 1931    17 Sheets-Sheet 4

INVENTOR
Raymond M. Hicks
BY
M. J. Reynolds
ATTORNEY

Jan. 3, 1939.   R. M. HICKS   2,142,691
TRANSMITTER AND CODE TRANSLATOR
Original Filed May 7, 1931   17 Sheets-Sheet 6

Jan. 3, 1939. R. M. HICKS 2,142,691
TRANSMITTER AND CODE TRANSLATOR
Original Filed May 7, 1931 17 Sheets-Sheet 7

INVENTOR
Raymond M. Hicks
BY
M. J. Reynolds
ATTORNEY

Jan. 3, 1939.   R. M. HICKS   2,142,691
TRANSMITTER AND CODE TRANSLATOR
Original Filed May 7, 1931   17 Sheets—Sheet 9
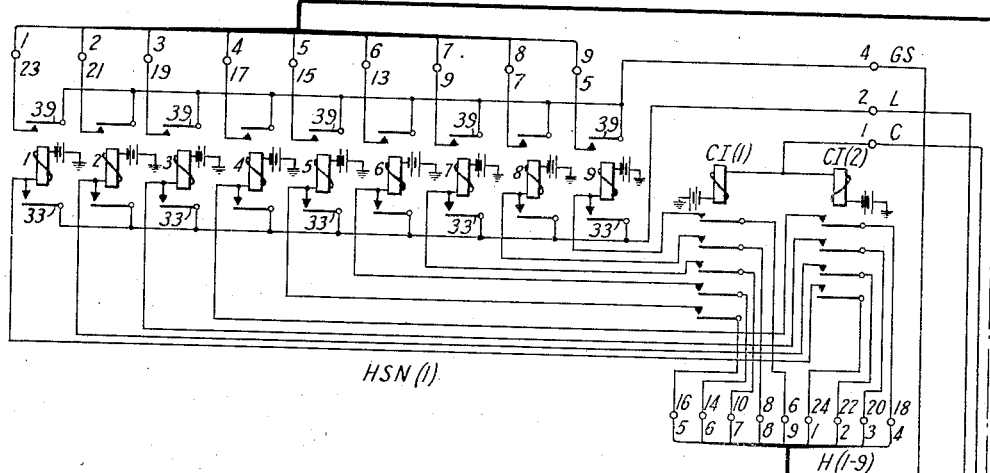
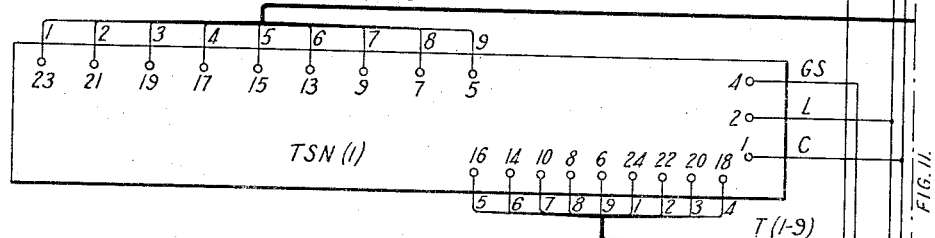
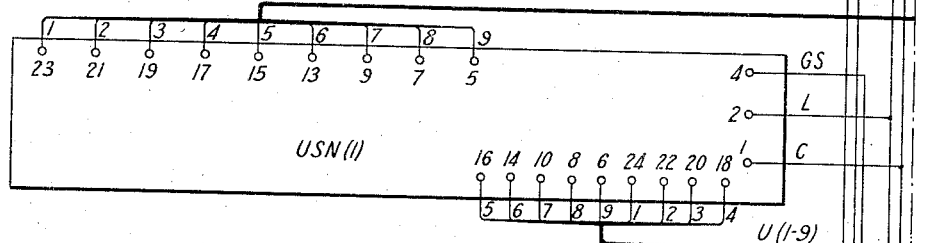
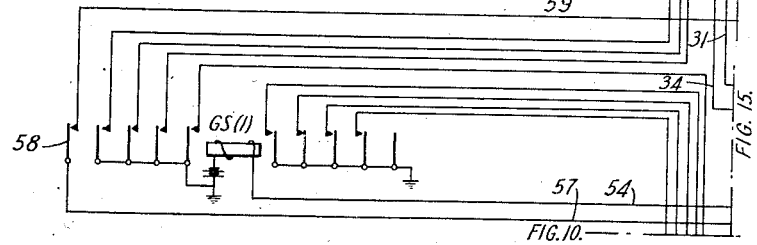
Fig. 9.
INVENTOR
Raymond M Hicks
BY
M. J. Reynolds
ATTORNEY Jan. 3, 1939.  R. M. HICKS  2,142,691
TRANSMITTER AND CODE TRANSLATOR
Original Filed May 7, 1931   17 Sheets-Sheet 13

INVENTOR
Raymond M. Hicks
BY M. J. Reynolds
ATTORNEY

Jan. 3, 1939.   R. M. HICKS   2,142,691
TRANSMITTER AND CODE TRANSLATOR
Original Filed May 7, 1931   17 Sheets-Sheet 14

INVENTOR
Raymond M. Hicks
BY
M. J. Reynolds
ATTORNEY

Jan. 3, 1939.                    R. M. HICKS                    2,142,691
                        TRANSMITTER AND CODE TRANSLATOR
                  Original Filed May 7, 1931    17 Sheets-Sheet 15

INVENTOR
Raymond M. Hicks
BY
M. J. Reynolds
ATTORNEY

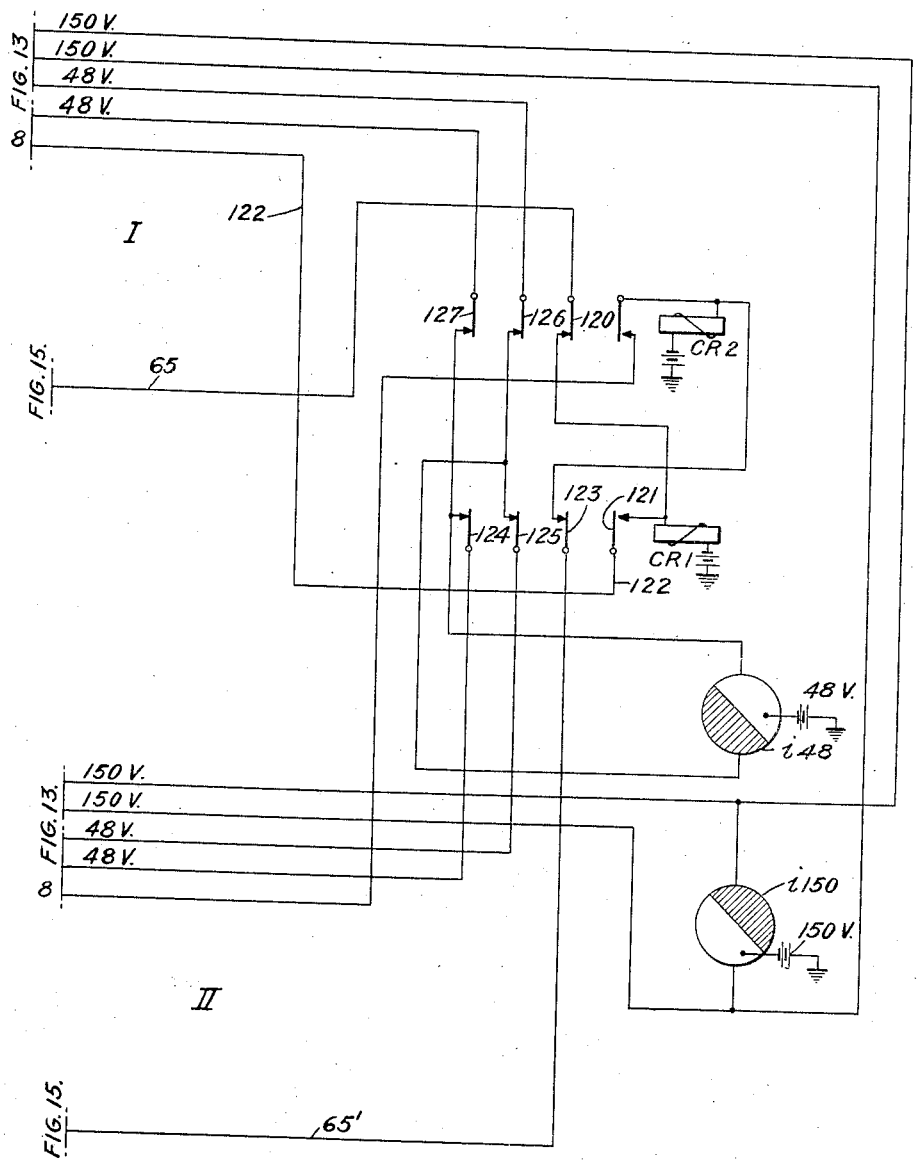

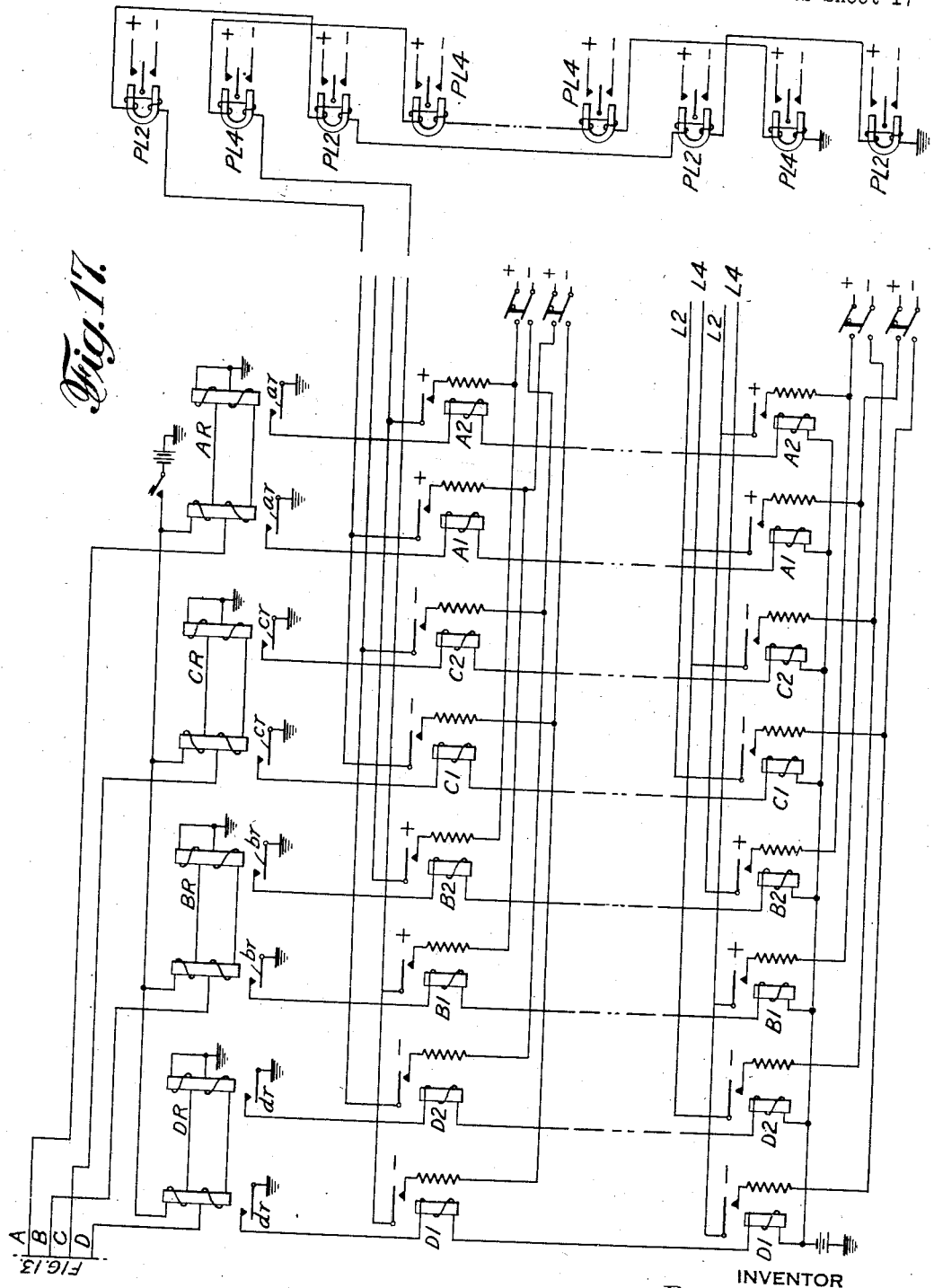

Patented Jan. 3, 1939

2,142,691

UNITED STATES PATENT OFFICE 2,142,691

TRANSMITTER AND CODE TRANSLATOR

Raymond M. Hicks, Plainfield, N. J., assignor to The Teleregister Corporation, New York, N. Y., a corporation of Delaware Original application May 7, 1931, Serial No. 535,672. Divided and this application August 1, 1935, Serial No. 34,287. Renewed September 9, 1937

10 Claims. (Cl. 177—380)

This invention relates to a transmitter and code translator for transmitting impulses from a central transmitting station to a plurality of receivers located at subscribers' stations to control the setting up of information relating to stocks or other items.

This application is a division of a joint application of Merton L. Haselton and Raymond M. Hicks, Ser. No. 535,672, filed May 7, 1931.

Among the objects of this invention is the provision of mechanism for transmitting under key or other known forms of control, impulses characterizing stock quotations or other items, to distant receiving stations including equipment adapted under control of said impulses to set up information according to the keys depressed or other control set-up, the provision of translating mechanism for translating one, two or three stock letter abbreviations into numbers, for storing stock numbers, price and range information, for storing information as to a stock quotation as previously stored information in reference to another stock quotation is transmitted, to provide for the alternate use and operation of said storage mechanism, to provide a dual system of transmission, to provide for control of each system by a plurality of operators, to provide for flexibility in assignment of stocks to said systems, to provide channeling mechanism for controlling the alternate transmission from the keyboards of each system, to provide improved transmitting mechanism and controlling mechanism, and generally to provide improved, reliable and high speed mechanism for carrying out the functions of the mechanism herein disclosed and coming within the scope of this invention.

Other objects will become apparent from a study of the description in connection with the accompanying drawings, in which Fig. 1 is a diagrammatic showing of the mechanisms of a dual transmitting system;

Fig. 2 is a schematic showing of the keyboard for controlling the embodiment of the invention herein disclosed;

Figs. 3 to 15 constitute a complete wiring diagram of the L B system indicated in Fig. 1;

Of these figures, Fig. 3 is a diagram of the first letter key relay groups and the ground control relay group;

Fig. 5a is a table of the stock letters and the corresponding number designation;

Fig. 9 shows one set of stock number storage relays;

Fig. 15 shows a wiring diagram of the synchronizing and wipe out relay group and the switching control relay group;

Fig. 16 shows a wiring diagram of the channeling mechanism; and

Fig. 17 shows a multiple line repeater.

GENERAL

Figure 1:
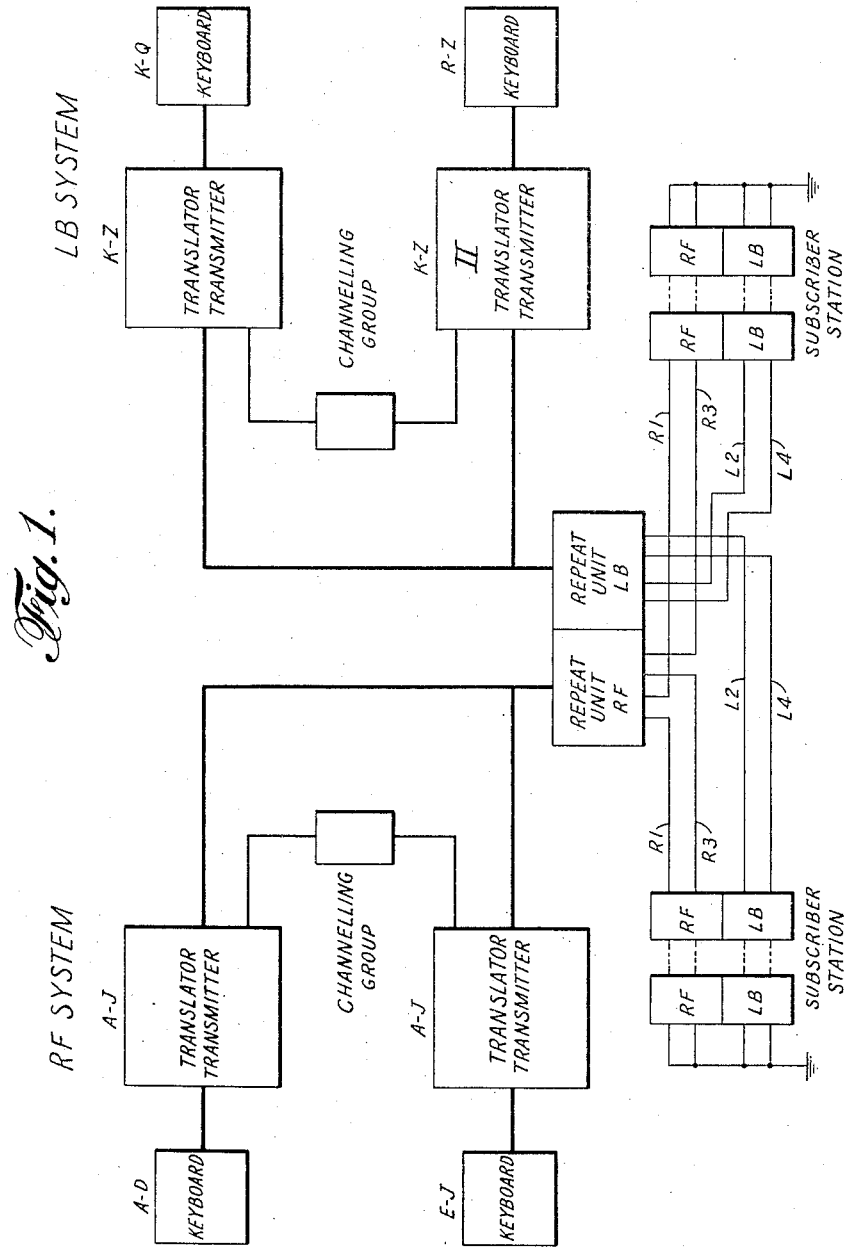

The invention is described in connection with a specific form of equipment disclosed in the drawings which constitutes one suitable form of embodiment of the invention.

The function of the teleregister transmitting equipment disclosed is to transform a stock quotation as written on a keyboard into electrical impulses which, in the particular embodiment disclosed, are transmitted over four trunk lines, Fig. 1, to repeater stations. The quotation consists of a letter abbreviation of a stock, a price, and a range in which the price is to be quoted. The stock abbreviation and the price may be taken from a ticker tape, and the range as posted during market hours is governed by the previous prices during the current day of the particular stock involved.

The electrical impulses are retransmitted from the repeater stations to subscribers' installations where they operate selector cabinets, the selector cabinets in turn select a stock and acuate the indicators in the teleregister boards. Subscribers' installations or receiving systems of the general type shown in the application for Letters Patent of the United States of Merton L. Haselton and Page S. Haselton for Electrical indicating systems, Serial No. 256,160 filed Feb. 23, 1928, Patent No. 1,890,878 dated Dec. 13, 1932, may be controlled by a transmitting equipment of the type herein described.

The transmitting and receiving systems may be arranged in units designed to quote a maximum of a thousand stocks each. For the purpose of introducing greater speed in the operation of the system two sets of equipment are provided making the total capacity of the system two thousand stocks. These sets of equipment are designated for purposes of identification as right front R F and left back L B, Fig. 1, respectively. The stocks to be quoted are divided into two groups and the first letter of the stock abbreviation determines the group in which the stock is posted. The stocks which have for their first letter of abbreviation the letters from A to J may be transmitted on the R F system, and the remainder of the stocks, namely, those whose abbreviations begin with K to Z may be posted on the L B system. This point of division between the systems is arbitrary and is determined by the number of stocks and the activity of the stocks falling in different parts of the alphabet.

*Principles of transmitter operation*

Figure 2:
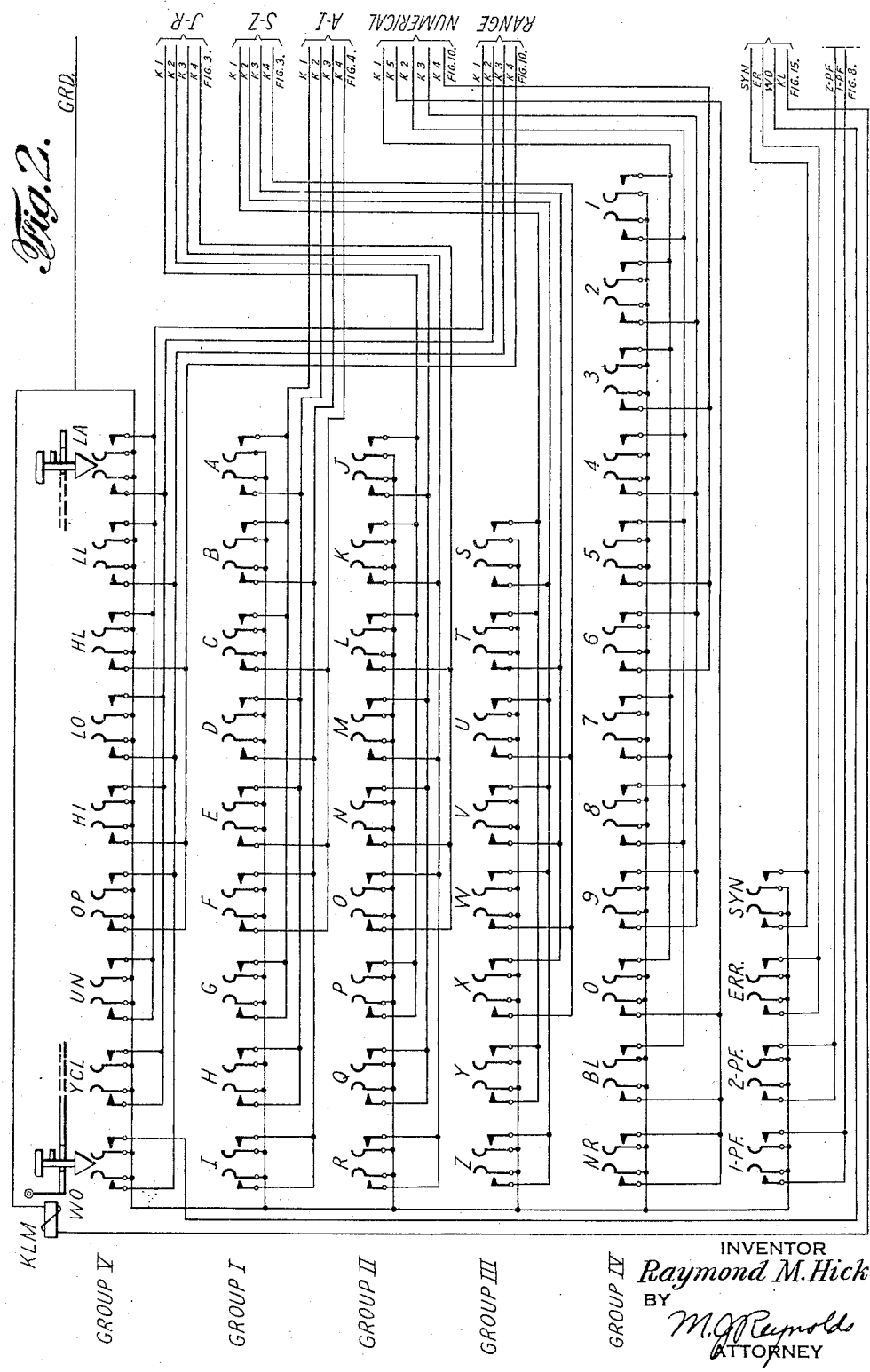

The transmission of a stock quotation is divided into three operations—stock selection, restoration of the stock selected, and actuation of the stock selected. The stock letter abbreviation as recorded on the keyset in Fig. 2 is stored in letter relay groups, Figs. 3 and 4, and is then translated into a three digit stock code number by the mechanism shown in Figs. 5, 6 and 7. After translation the code number is stored in one of the stock number relay groups, Figs. 9 and 11, and is ready for transmission.

Figure 10:
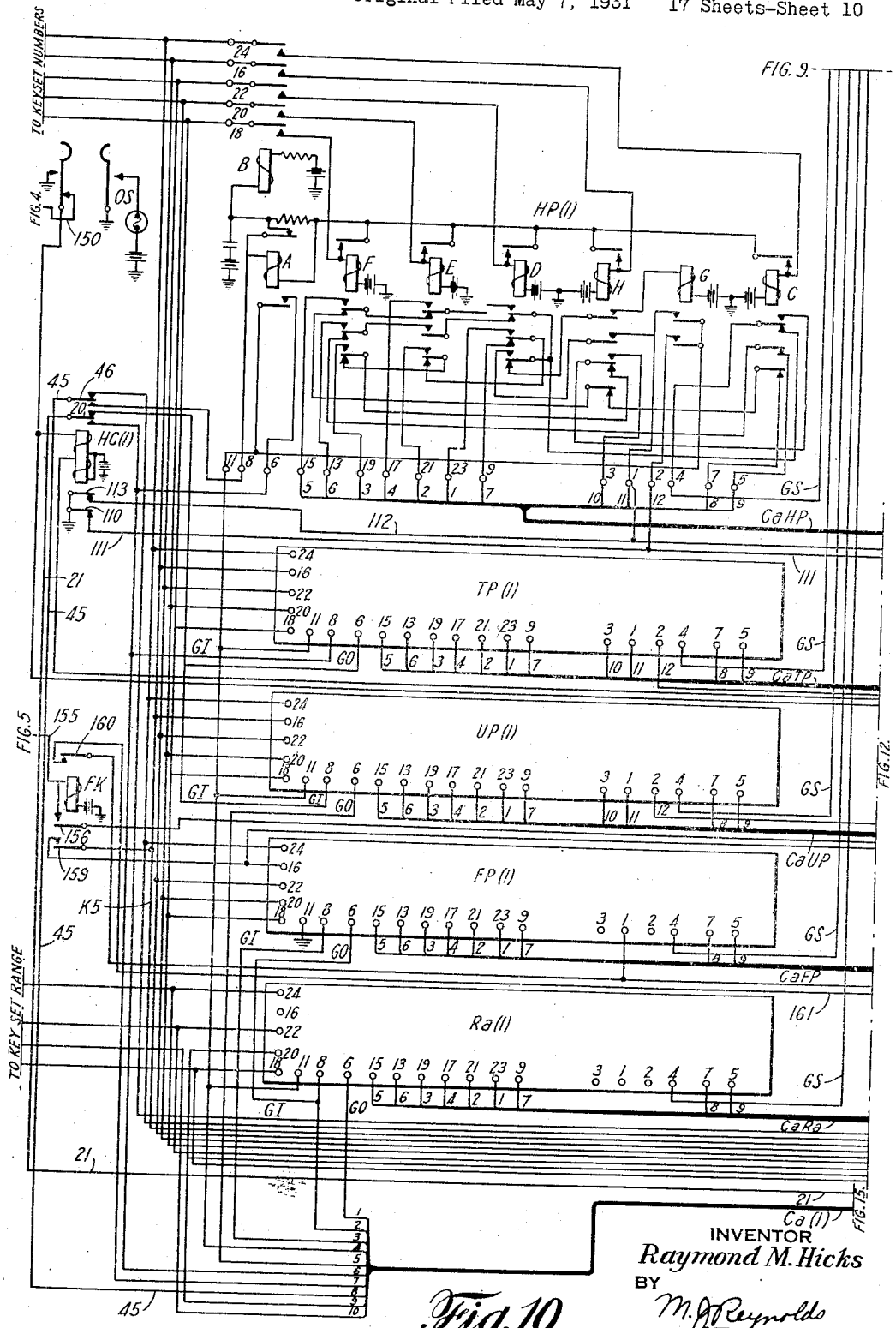
Fig. 10 shows one set of price digit and range storage relays.
Figure 12:
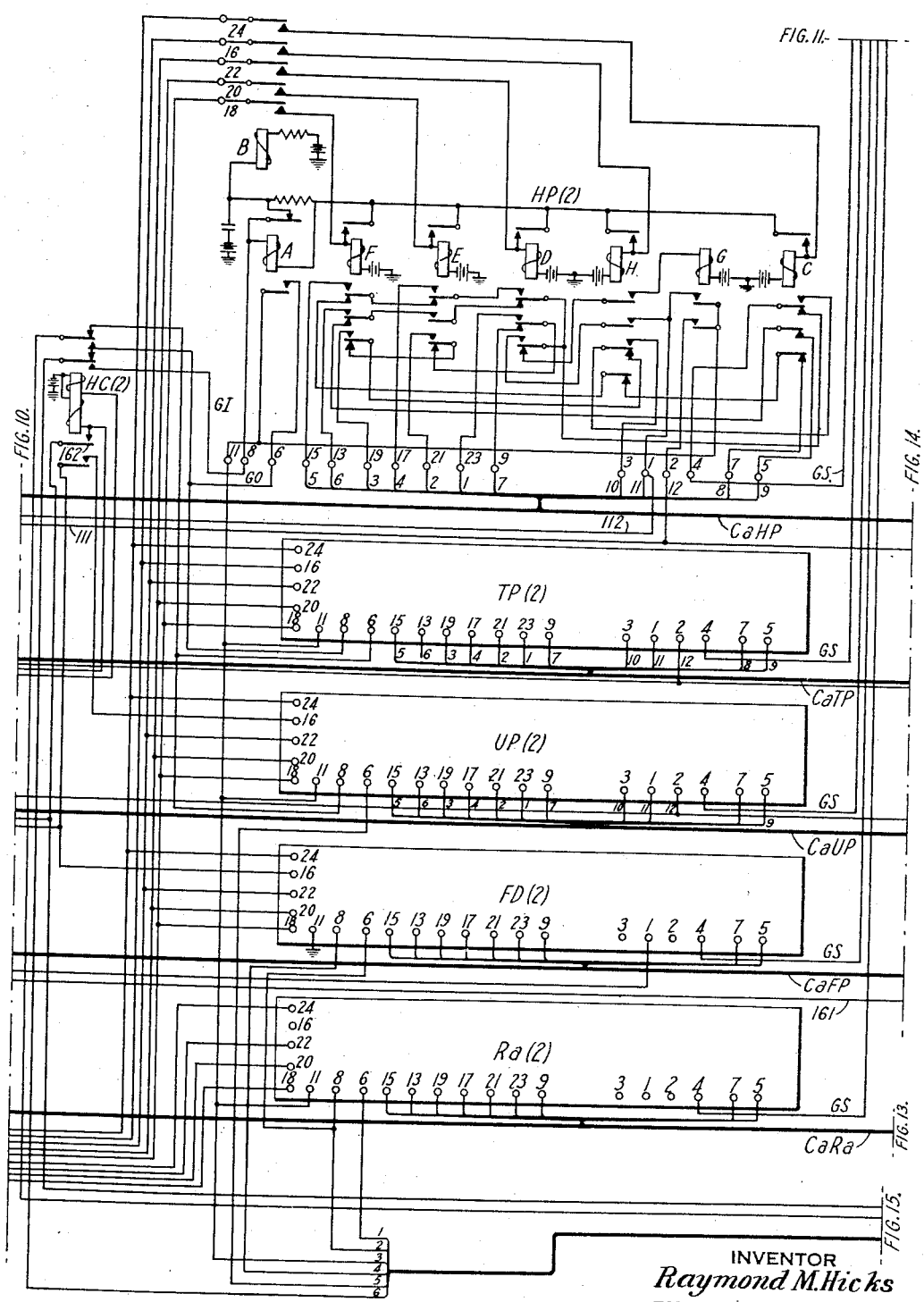
Fig. 12 shows a second set of price digit and range storage relays.

The stock prices are recorded in one of the number key relay groups and the range is stored in one of the range key relay groups, as shown in Figs. 10 and 12. These stored combinations of information are then held in readiness for transmission in the proper sequence. The number of impulses sent out is governed by the particular combinations which are stored and is controlled by the transmission units, Figs. 13 and 14. Pulses are constantly available from an impulse machine, and the transmission unit closes the circuit to the line from the pulse machine and, after a sufficient number of pulses have been sent, cuts off the pulses from the line. The operations involved therefore include the storage of the key depressions in each of several relay groups; the translation of the stock letters into a stock code number and the storage of this code number; and the transmission of pulses the number of which is determined by the combinations set up in the storage relays.

The mechanism disclosed may be divided into four units, namely, the key set, the translator, the transmitter, and the impulse generator.

CIRCUIT OPERATION

The description of circuit operation which follows is given for the L B system only, but, by the substitution of the proper first letters of the stock abbreviations this description is applicable to the R F system.

*Operation of the keyset*

When the operator depresses a key in the keyset, Fig. 2, a combination of grounds is connected to the transmitter as follows:

| Key depressions in keyset | | | Connects ground to leads |
|---|---|---|---|
| Group 1 | Group 2 | Group 3 | |
| A | J | S | K—1 and K—2 |
| B | K | T | K—1 and K—3 |
| C | L | U | K—1 and K—4 |
| D | M | V | K—2 and K—3 |
| E | N | W | K—2 and K—4 |
| F | O | X | K—3 and K—4 |
| G | P | Y | K—1 |
| H | Q | Z | K—2 |
| I | R | ---------- | K—3 |

| Group 4 | Connects ground to leads |
|---|---|
| 1 | K—2 and K—2 |
| 2 | K—1 and K—3 |
| 3 | K—1 and K—4 |
| 4 | K—2 and K—3 |
| 5 | K—2 and K—4 |
| 6 | K—3 and K—4 |
| 7 | K—1 |
| 8 | K—2 |
| 9 | K—3 |
| 0 | K—1 and K—5 |
| B1 | K—2 and K—5 |
| NR | K—5 |

| Group 5 | Connects ground to leads |
|---|---|
| LA | K—1 and K—2 |
| LL | K—1 and K—3 |
| HL | K—1 and K—4 |
| LO | K—2 and K—3 |
| HI | K—2 and K—4 |
| OP | K—3 and K—4 |
| UN | K—1 |
| YCL | K—2 |
| WO | K—3 and "WO" lead |

Depression of any one of the other keys, SYN, ERR, 2—PF and 1—PF, puts a ground on an individual lead to the transmitter.

*Operation of the letter key relays and the ground control relays*

Figure 3:
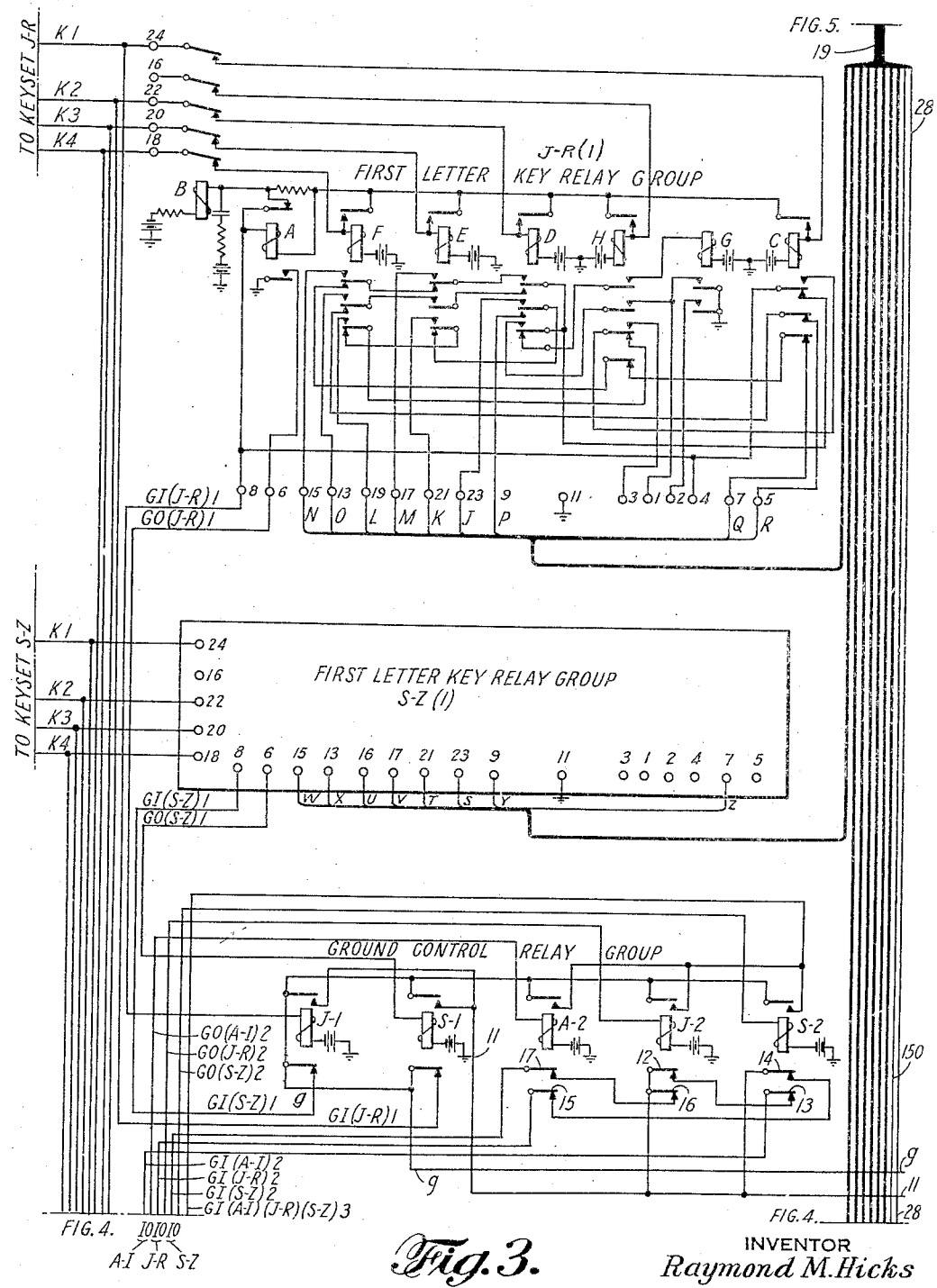

When the transmitter is normal before the operator starts to write a quotation the B relay in each of the two first letter key relay groups, Fig. 3, is operated. The first letter key relay group (J—R) 1 is shown in detail. All of the other letter key relay groups are of identical construction.

The circuit of the B relay in group J—R(1) is as follows: Ground from the break contacts *er1* on the ER relay in the switching control relay group, Fig. 15, is connected through the break contacts on the LR relay in the switching control relay group to line *g* and extends in Fig. 3 through the break contact on the S—1 relay in the ground control relay group to the "ground in" line GI(J—R) 1 of the first letter key relay group and through the break contact on the A relay in the J—R(1) first letter key relay group to one terminal of the winding of the B relay to the other terminal of which battery and ground are connected.

The B relay, Fig. 3, in the S—Z(1) first letter key relay group is operated from the same ground through the break contact on the J—1 relay in the ground control relay group, over "ground in" line GI(S—Z) 1 and through the break contact on the A relay in the S—Z(1) first letter key relay group to the winding of the B relay in that group.

Grounds from the keys in the keyset, Fig. 2, are connected through the make contacts of the B relays, Fig. 3, in the first letter key relay groups to the windings of the storage relays in the groups to operate them. These grounds do not operate the relays in the second and third letter key relay groups, Fig. 4, because the B relays in these groups are not operated.

Figure 4:
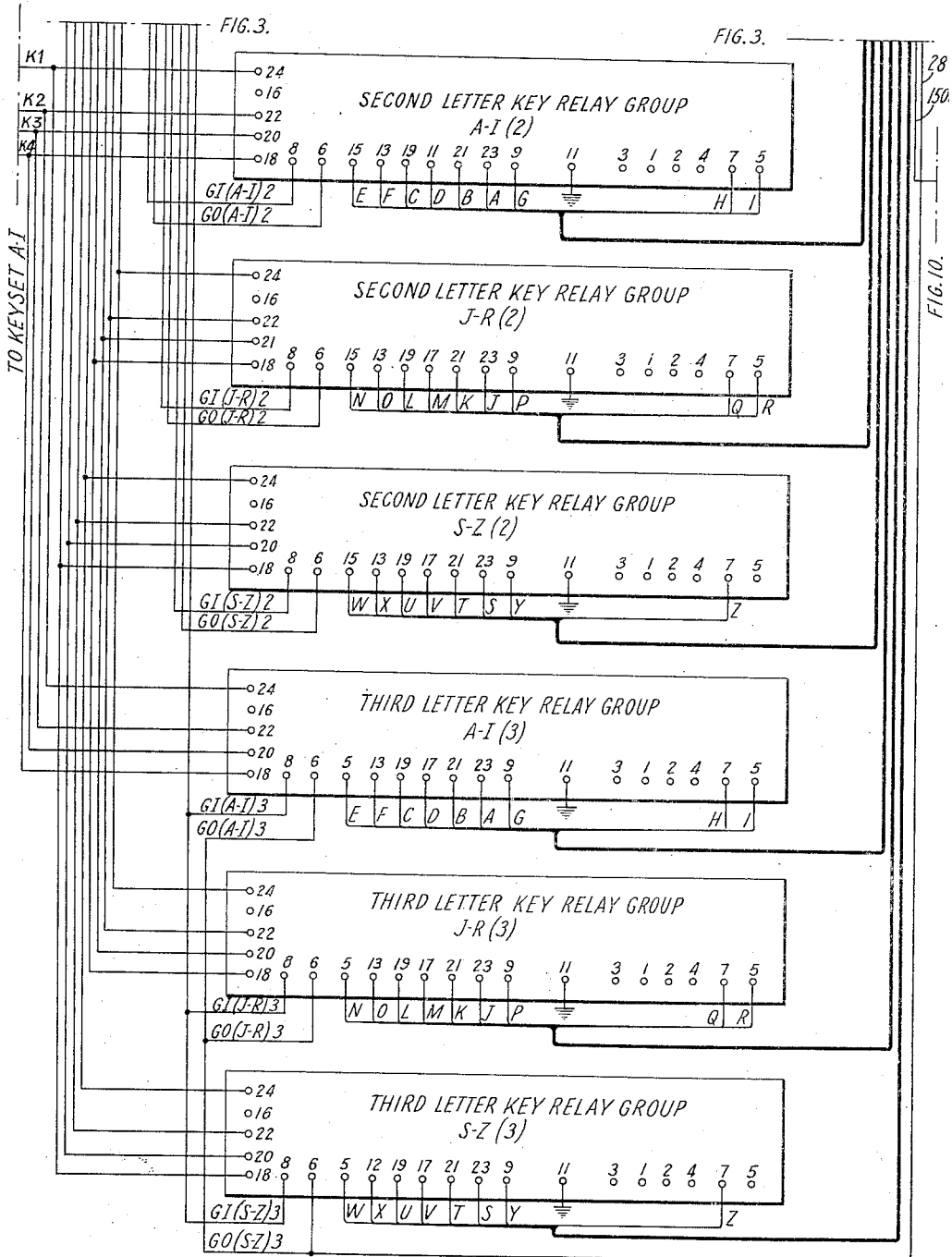
Fig. 4 is a wiring diagram of the second and third letter key relay groups.

When one or two relays in the first letter key relay group J—R(1) operate, a ground which is supplied from the "ground in" line GI(J—R)1 to that group is connected as shown in Fig. 3 over the contacts of the various relays to one of nine outgoing leads. There is one of these leads for each letter which is recorded in that particular group. The combinations of relays which are operated for the various letters in the various letter key relay groups are as follows:

| Ground on key leads | Operates relays | And connects ground to letter lead figures 3 and 4 |
| --- | --- | --- |
| 1 and 2 | C and D | A, J, or S |
| 1 and 3 | C and E | B, K, or T |
| 1 and 4 | C and F | C, L, or U |
| 2 and 3 | D and E | D, M, or V |
| 2 and 4 | D and F | E, N, or W |
| 3 and 4 | E and F | F, O, or X |
| 1 |  | G, P, or Y |
| 2 | D | H, Q, or Z |
| 3 | E | I, or R, |

While the operator holds down the key in the keyset the A relay in the first letter key relay group J—R(1) is kept unoperated since it has ground on both sides of its winding but when the operator releases the key, one of these grounds is removed and the A relay operates in series with the storage relay or relays which are operated in that group. If two storage relays are operated, the A relay operates in a series parallel circuit, the A relay being in series with the two storage relays which are in parallel. The ground which operates the A relay and keeps it and the storage relays locked up is "ground in" line GI(J—R)1 to the relay group.

The operation of the A relay in the first letter key relay group J—R(1) inserts a suitable resistance in the operating circuit of the B relay of that group, reducing the current through the B relay winding below its minimum holding value, so that the B relay releases.

When the A relay in the first letter key relay group J—R(1) operates, it puts a ground on the "ground out" lead GO(J—R)1 and operates the J—1 relay in the ground control relay group. When the A relay in the first letter key relay group S—Z(1) operates it puts ground on the "ground out" lead GO(S—Z)1 and operates the S—1 relay in the ground control relay group.

The operation of the J—1 or the S—1 relay cuts off the "ground in" to the first letter key relay group which was not used and releases the B relay in that group. Thus, if the first letter is recorded in the J—R(1) first letter key relay group, the operation of the J—1 relay cuts off the "ground in" to the S—Z(1) first letter key relay group and vice versa. "Ground in" remains on the group which is in use and keeps the A relay and its series relay or relays C to H operated. It also keeps a ground on the proper outgoing lead from this group.

The operation of the J—1 or the S—1 relay in the ground control relay group puts "ground in" to all of the second letter key relay groups A—I(2), J—R(2) and S—Z(2), Fig. 4, and operates the B relays in all of these groups.

The circuit for the A—I(2) second letter key relays, Fig. 4, is as follows: Ground from the break contacts on the ER relay in the switching control relay group, Fig. 15, is connected through the break contacts on the LR relay in the switching control group to line g as before, and continues through the make contact on the J—1 or S—1 relay in the ground control relay group, Fig. 3, over line 11, through the upper break contact 12 on the J—2 relay, and through a break contact 13 on the S—2 relay to the "ground in" line GI(A—I)2 for the A—I(2) second letter key relays, Fig. 4.

The circuit for "ground in" to the J—R(2) second letter key relays, Fig. 4, is similar to that for the A—I(2) second letter key relays except that the ground from the make contact of the J—1 or S—1 relay in the ground control relay group, Fig. 3, is connected through break contact 14 on the S—2 relay and the break contact 15 on the A—2 relay to the "ground in" line GI(J—R)2 for the J—R(2) second letter key relay group, Fig. 4.

The circuit for the S—Z(2) second letter key relay group Fig. 4 differs from the two previous circuits in that it is connected through break contact 16 on relay J—2 and break contact 17 on relay A—2 in the ground control group, Fig. 3, to the "ground in" line GI(S—Z)2 for the S—Z(2) second letter key relay group, Fig. 4.

The operation of either the J—1 or the S—1 relay connects a ground through its make contact and line "11" out of this group to the switching control relay group, Fig. 15, to supply "ground in" to the tens number key relay groups, Figs. 10 and 12, as will be described later. Therefore, if the stock abbreviation contains but one letter, the number key relay groups will be prepared to receive the stock price write up.

A key depression of a second letter operates one or two storage relays in one of the second letter key relay groups, Fig. 4. The operation is similar to that of the first letter key relays, Fig. 3, and when the operator releases the key in the keyset, a ground is connected to one of the outgoing letter leads.

"Ground out" over lines GO(A—I)2, GO(J—R)2 or GO(S—Z)2 of the second letter key relay group, Fig. 4, operates the A—2, J—2 or S—2 relay in the ground control relay group, Fig. 3. If the second letter is recorded in the A—I(2) second letter group, the A—2 relay operates; if it is recorded in the J—R(2) group, the J—2 relay operates; and if it is recorded in the S—Z(2) group the S—2 relay operates.

The operation of the A—2, J—2 or S—2 relay removes the "ground in" from the two second letter key relay groups which were not used to record the second letter, and releases the B relays in those groups. The operation of the A—2, J—2 or S—2 relays also connects "ground in" GI(A—I) (J—R) S(—Z)3 to all of the third letter relay groups, Fig. 4. The circuit is as follows: Ground from the break contacts on the ER relay in the switching control relay group, Fig. 15, through the break contacts on the LR relay in the switching control relay group, Fig. 15, over line g, through the make contact on the A—2, J—2 or S—2 relays, Fig. 3, to "ground in" GI(A—I) (J—R) (S—Z)3 to all of the third letter key relay groups.

The operation of the third letter key relay groups A—I(3), J—R(3) and S—Z(3), Fig. 4, is the same as that of the first and second letter key relays.

After the depression of three letter keys in the keyset, the following circuit condition is present in the letter key relay and ground control relay groups.

The A relay and one or two storage relays in one of the first, second and third letter key relay groups, Figs. 3 and 4, are operated, and a ground is connected to one of the outgoing letter leads of each operated group. The B relays in the two third letter relay groups which were not used remain operated and all other relays in the groups are released. In the ground control relay group the J—1 or S—1 relay is operated, and the A—2, J—2 or S—2 relay is operated.

OPERATION OF THE CODE TRANSLATOR

One letter stock abbreviations

Figure 5:
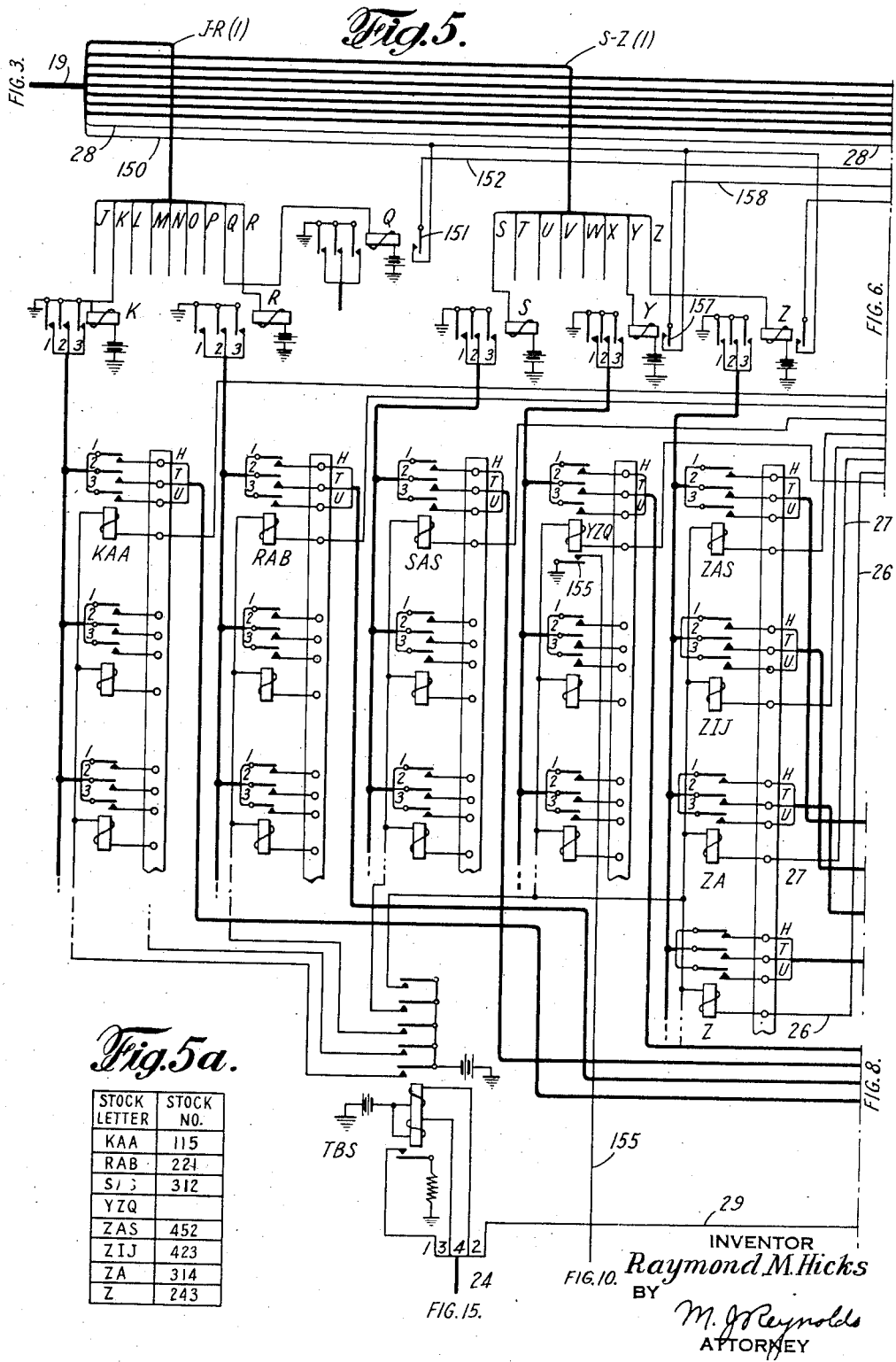
Fig. 5 is a wiring diagram of the first letter relays in the translator and certain of the stock relays.

When a ground is placed on one of the outgoing leads from one of the first letter key relay groups, Fig. 3, it operates one of the first letter relays in the translator. Cable 19, Figs. 3 and 5, includes all of the letter leads on Figs. 3 and 4. Fig. 5 shows the relays K, R and Q of the first letter relays J to R and relays S, Y and Z of the first letter relays S to Z. The remaining first letter relays are not shown. The ground supply for the outgoing leads of the letter key relays, Fig. 3, is the same ground as furnishes "ground in" for these relays so that the first letter relay in the translator, Fig. 5, will be operated as soon as the first letter of the stock abbreviation is recorded in the letter key relays, Fig. 3.

The operation of a first letter relay in the translator, Fig. 5, connects three grounds to the armatures of all the stock relays representing those stocks which have for their first letter the particular letter which has been recorded in the first letter key relay group. See for example first letter relay Z and stock relays ZAS, ZIJ, ZA and Z, etc., Fig. 5.

For one letter stock abbreviations the operator follows the depression of the letter key by the depression of a number key, Fig. 2, which is recorded in one of the tens price number key relay groups, Figs. 10 and 12. "Ground out" of this group operates the TBS relay in the translator. The circuit is as follows: "Ground out" GO of the tens number key relay group, TP(1), Fig. 10, through a break contact 20 on the HC—1 relay, over line 21, Figs. 10 and 15, through a break contact 22 on the L1 relay in the switching control relay group, Fig. 15, over line 23 and line 3 of cable 24, Figs. 15 and 5, to the winding of the TBS relay which operates.

When the TBS relay operates it connects battery to one side of the windings of all of the stock relays in the translator, Fig. 5. See relays KAA, RAB, SAS, ZAS, ZIJ, ZA, etc. The (—) and NB relays, Fig. 6, in the translator have not been operated, so ground is connected from the break contact on the NB relay, through a break contact 25 on the (—) relay and line 26, (Figs 6 and 5), to the windings of all of the stock relays for one letter stock abbreviations. Thus, assuming that each of the letters from K to Z is used as a single letter stock abbreviation, the sixteen relays in the stock relay circuit representing these stocks will be operated in multiple from the ground on the (—) relay break contact. If the letter abbreviation of the stock which is being transmitted is "Z", the armatures of all stock relays for stock abbreviations having "Z" as their initial letter will have three grounds placed on them but the only stock relay of this group which is operated will be the one representing "Z" stock.

The following table gives several examples of the stock relay coordinate system of selection:

| Stock abbreviation | Stock relays operated | Stock relays having ground on the armatures |
| --- | --- | --- |
| K | K to Z | K; K(A—Z); K(A—Z) (A—Z). |
| KR | (K—Z)R | Same as for K stock. |
| LR | Same as for KR stock | L; L(A—Z); L(A—Z) (A—Z). |
| KOR | (K—Z)OR | Same as for K stock. |
| LOR | Same as for KOR | Same as for LR stock. |
| X | Same as for K stock | X; X(A—Z); X(A—Z) (A—Z). |

It will be noticed that for each stock the letter abbreviation which appears in both the second and third columns is the abbreviation of the stock selected.

Figure 8:
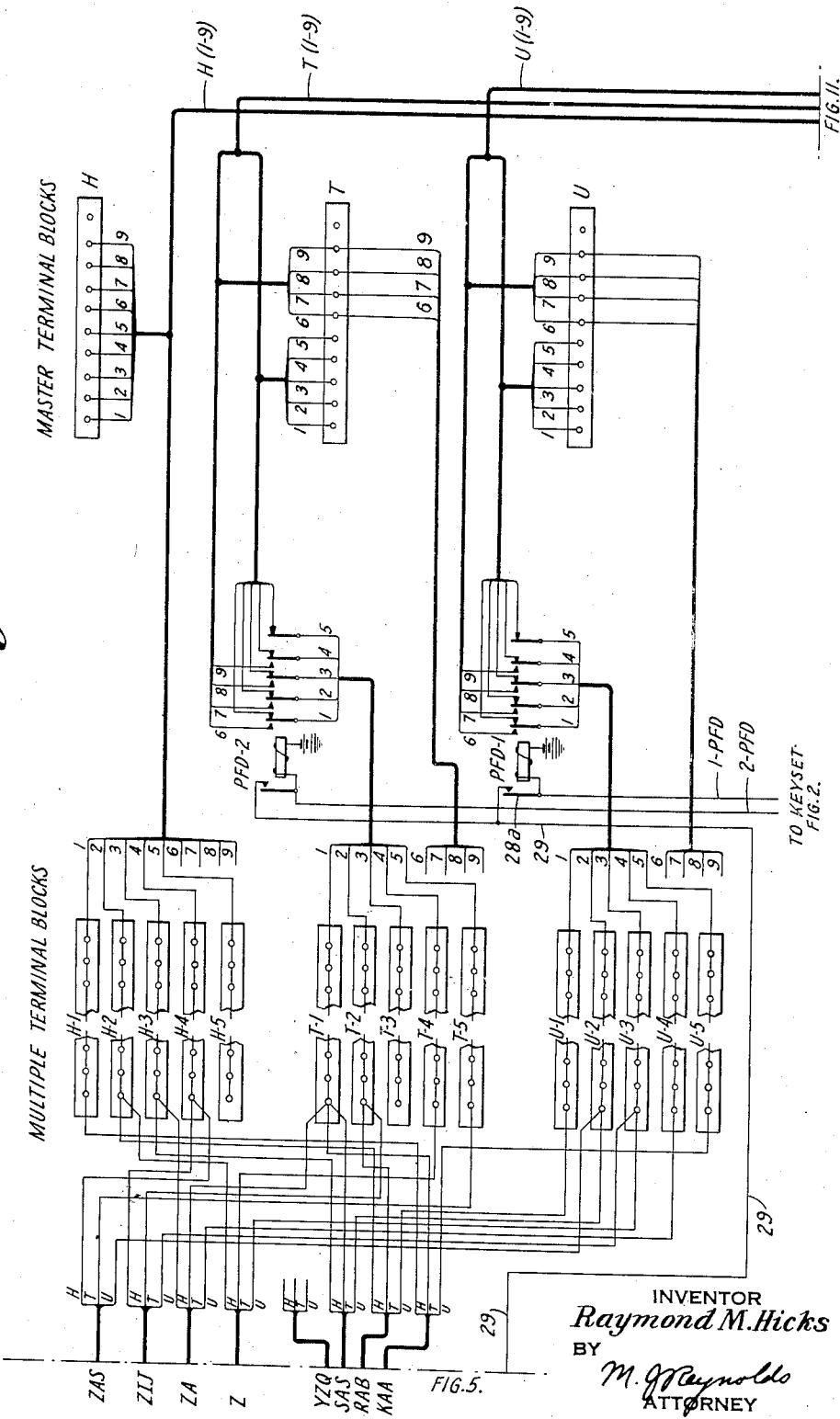
Fig. 8 shows certain of the multiple terminal blocks, master terminal blocks, and the preferred relays.

The three grounds on the armatures of the stock relay representing the stock selected are connected through the make contacts of the relay to the multiple terminal blocks, Fig. 8, in the translator. One of these leads is connected to the hundreds multiple terminal block H—1 to H—5, etc., one to the tens T—1 to T—5, etc., and one to the units U—1 to U—5, etc., and, with this arrangement it is possible to assign any stock code number for the stock by cross-connecting these three grounds to the proper terminals in the multiple terminal blocks. Taking the example given above—that of stock abbreviation "A"—the hundreds ground is connected to the second hundreds multiple terminal block H—2, the tens ground to the fourth tens terminal block T—4, and the units ground to the third units terminal block U—3, giving a stock code number for this stock of 243. The 6, 7, 8 and 9 terminal blocks are not shown.

Two letter stock abbreviations

When the operator depresses a second letter key it is recorded in one of the second letter key relay groups, Fig. 4, and ground is connected to one of the outgoing letter leads from this group. This ground operates three of the second letter relays in multiple, Fig. 6, and in addition operates the (—) relay in series with the three second letter relays. See lead A, Fig. 6, connected to relays A, S—Z; A, J—R; A, A—I, and the (—) relay, lead I connected to I, S—Z; I, J—R; I, A—I, and the (—) relay, and lead S, Fig. 7, connected to the S, S—Z; S, J—R; S, A—I, and the (—) relay.

Figure 6:
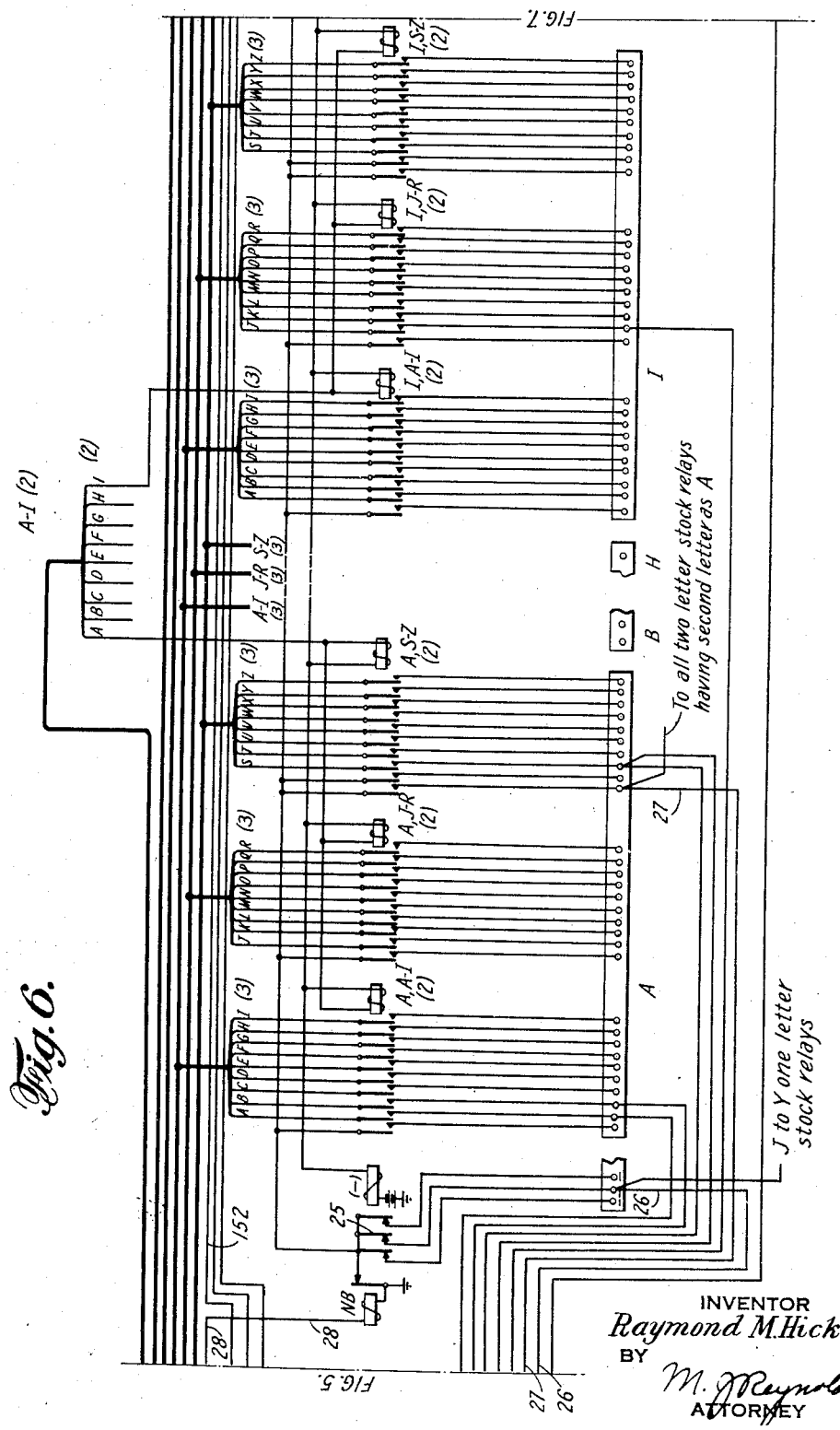
Figs. 6 and 7 show certain of the second letter relays in the translator and certain of the lines grounded in the third letter key relay groups.

When the three second letter relays and the (—) relay in the translator are operated a ground from the break contact on the NB relay is connected through the (—) contact on each of the three second letter relays which are operated, to the windings of all of the two letter stock relays having for the second letter of their abbreviation the second letter recorded by the operator. As shown in Fig. 6 the (—) contact of the relay A, S—Z extends ground over line 27 to the winding of the ZA relay, Fig. 5, and all stock relays having the same second letter and first letter J—Y.

In the instance being considered, the next key which the operator depresses will be a number key, and the "ground out" of the tens number key relay group operates the TBS relay in the translator as outlined before. The operation of the TBS relay connects battery to one side of all of the stock relay windings, and those two letter stock relays which have ground on the other side of their windings will operate.

The first letter relay, Fig. 5, which was operated by the first key depression placed three grounds on the armatures of all of the stock relays for stocks starting with that letter as explained before and the operation of the two letter stock relays explained above connects these three grounds to the proper hundreds, tens, and units multiple terminal blocks.

*Three letter stock abbreviations*

If the operator depresses a third letter key it is of course recorded in one of the third letter key relay groups, Fig. 4, and a ground is placed on one of the outgoing letter leads of this group. This ground is multipled to one armature on each of the second letter relays, Figs. 6 and 7, but since one group of three second letter relays is operated there is but one path for this ground to follow and that is through the make contact of the second letter relay which is operated. This ground is connected to all of the stock relays the second and third letters of which are the same as the second and third letters which have been recorded. As in the case of one and two letter stock abbreviations the three grounds supplied by the first letter relay are connected through the stock relay make contacts, Fig. 5, to the proper terminals in the multiple terminal blocks to give the desired stock code number.

"Ground out" of the third letter key relay group, Fig. 4, over line 28, Figs. 4, 3, 5 and 6, operates the NB relay, Fig. 6, in the translator and disconnects ground from the (—) contacts of the second letter relays to prevent any of the two letter stock relays from operating.

The leads from the multiple terminal blocks, Fig. 8, are connected through the contacts of the preferred relays, PFD—1 and PFD—2, to the master terminal blocks. The master terminal blocks contain terminals for leads 1 to 9 inclusive of the hundreds, tens, and units digits of the stock code numbers.

*Preferred stocks*

For common stocks having first preferred issues a stock code number is selected, the units digit of which is 5 or less than 5. When the first preferred key, 1—PF, Fig. 2, in the keyset is depressed following the write-up of the stock letter abbreviation, the first preferred relay PFD—1, Fig. 8, is operated and 5 is added to the units digit of the stock code number.

The leads from the units—1 to units—5, U—1 to U—5, multiple terminal blocks, Fig. 8, are connected to the armatures of PFD—1 relay. The break contacts of these armatures are connected to 1 to 5 on the master terminal blocks, and the make contacts of the armatures with which leads 1 to 4 are associated are connected to 6 to 9 on the master terminal blocks. As will appear later the zero digits of a stock number are not set up in the stock number relays.

Depression of the first preferred key in the keyset, Fig. 2, operates the PFD—1 relay in the translator directly. The PFD—1 relay locks up to ground over its break contact 28a, line 29, Figs. 8 and 5, line 2 of cable 24, Figs. 5 and 15, and over a break contact er2 on the ER relay in the switching control relay group, Fig. 15.

The operation of the PFD—1 relay transfers the connections on its armatures from the 1, 2, 3 and 4 terminals of the master terminal blocks to the 6, 7, 8 and 9 terminals respectively and it opens the connection to the 5 terminal. When the PFD—1 relay is operated, a ground placed on the units 1, 2, 3 or 4 multiple terminal block will be connected to the 6, 7, 8 or 9 terminals on the units master terminal block.

The operation of the PFD—2 relay changes the tens digit of the stock code number in the same manner as the PFD—1 relay changes the units digit and locks to ground over line 29 as in the case of the PFD—1 relay.

*Operation of stock number relays*

Figure 11:
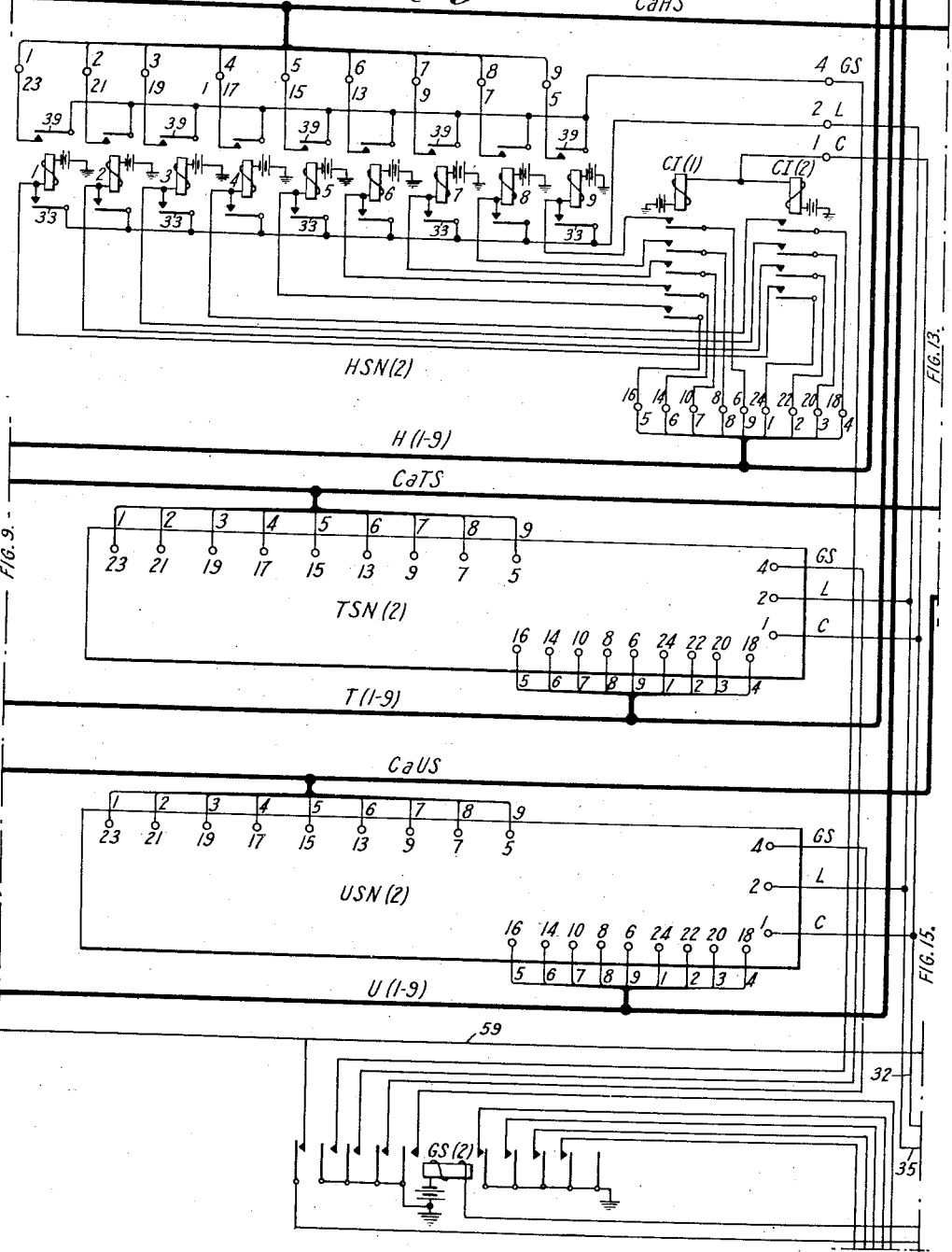
Fig. 11 shows a second set of stock number storage relays.

From the master terminal blocks there is one lead for each of the digits from 1 to 9 for the hundreds, tens, and units digit of the stock code number. These leads H(1 to 9), T(1 to 9) and U(1 to 9), Figs. 8, 11 and 9, are connected to the windings of the storage relays in the stock number relay groups, Figs. 9 and 11, through the make contacts of the CI relays in those groups. The leads are multipled to both sets of stock number relay groups so that the stock code number is available for storage in either group depending on which of the CI relays are operated.

Immediately following the operation of the J—1 or S—1 relay in the ground control relay group, Fig. 3, ground is placed through a break or a make contact on the GOC, Fig. 15, relay in the switching control group to either the first or second set of stock number relay groups, Figs. 9 and 11. If the GOC relay is not operated the first set of stock number relay groups, Fig. 9, will be used. The circuit is as follows: Ground from the break contacts er1 on the ER relay in the switching control relay group, Fig. 15, through the break contacts on the LR relay in the switching control group out over line *g*, through a make contact on the J—1 or S—1 relay in the ground control relay group, Fig. 4, over line 11, Figs. 4 and 15, through a break contact 30 on the GOC relay in the switching control group, and line 31, Figs. 15 and 9, and line C to the windings of the six CI relays in the first set of stock number relay groups, Fig. 9.

If the GOC relay, Fig. 15, is operated the same ground is connected through the operated contact 30 of the GOC relay and line 32, Figs. 15 and 11, and line C, Fig. 11, to the windings of the CI relays in the second set of stock number relay groups, Fig. 11. The operation and release of the GOC relay will be described later.

After the recording of the first letter of the stock abbreviation in the letter key relay group, Fig. 3, one set of stock number relay groups, Figs. 9 and 11, is therefore prepared to receive the stock code number from the translator. The grounds from the master terminal blocks operate one digit storage relay 1 to 9 in each of the hundreds, tens and units stock number relay groups. The relays are locked up to ground over their make contacts 33, lines L, 34 and 35, Figs. 9, 11 and 15, on the break contacts er1 of the ER relay in the switching control group, Fig. 15. The connection from the holding line 34 for the relays in Fig. 9 is made across the normal contact 36 of the energized GO relay and line 37 to the contacts er1 of relay ER. When the GO relay is deenergized the holding line 35 for the relays in Fig. 11 is connected to line 37 over contact 38 of relay GO. The operation of one of the relays in a stock number relay group closes a circuit from the ground supply line GS over its make contact 39, digit lines 1 to 9 in cable C*a*HS, C*a*TS and C*a*US, Figs. 9, 11 and 13, to one of the contact banks on the rotary switch in one of the stock number transmission units HSN, TSN and USN, Fig. 13. This circuit is held in readiness for the operation of the transmission units.

The entire operation of the translator is accomplished in the time between the release of the first and the release of the second number keys in the keyset. Following the release of the second number key in the keyset, the translator and the letter key relays are released as will be described later.

OPERATION OF THE NUMBER KEY RELAYS

When the operator depresses a number key in group IV of the keyset, Fig. 2, to write up the stock price, one of two grounds are connected to the number key relay group which has its B relay operated. The operation of the B relay in the number key relay group is under the control of the switching control relay group, Fig. 15, and the hundreds control relay H(l). The switching control relay group determines which set of number key relays will be used, and the hundreds control relay determines whether the first number in the stock price shall be recorded in the hundreds number key relay group or in the tens number key relay group.

If the quotation being written is the first one following closure of the transmitter battery switch the GO relay in the switching control relay group Fig. 15, will be operated through a break contact 40 on the GOC relay. Under this condition #1 number key relay groups, Fig. 10, will be used. When the J—I or S—I relay in the ground control relay group, Fig. 3, operates, it connects the ground supply over line g for the letter key relays over line II, through a make contact 41 on the GO relay in the switching control group to operate the H(I) relay, Fig. 15. The operation of the H(I) relay connects "ground in" to #1 tens number key relay group. The circuit is as follows: Ground from the break contacts erI on the ER relay in the switching control group, Fig. 15, over line 37, through the make contact 36 on the GO relay in the switching control group, through a make contact 42 on the H(I) relay in the switching control group, over line 43, through a break contact 44 on the WO—I relay in the synchronizing and wipeout relay group, Fig. 15, over line 8 in cable Ca(I), Figs. 15 and 10, over line 45, through a break contact 46 on the HC(I) relay, Fig. 10, to "ground in" GI to the tens number key relay group, TP(I).

With the HC(I) relay unoperated, the first price digit written by the operator will be recorded in the tens number key relay group TP(I), Fig. 10. The release of the key operates the A relay in this group in the same manner as the A relays in the letter key relay groups are operated. The storage relays and the A relay in the group lock up to "ground in". The operation of the A relay closes the circuit for "ground out" of the group and this ground becomes "ground in" for the units number key relay group. The depression of a number key operates the relays of the number key relay groups to connect ground GI to the various I to I2 leads in cables CaHP, CaTP, CaUP, and CaFP, Figs. 10, 12 and 14.

The second number written by the operator is recorded in the units number key relay group UP(I). "Ground out" GO of this group over line 5 in cable Ca(I), Figs. 10 and 15, and line 48 operates the LI relay in the switching control relay group, Fig. 15. When the LI relay operates, the TBS relay, Fig. 5, in the translator releases as its circuit is broken at contact 22 of relay LI, releasing the stock relays in the translator. The operation of the LI relay also closes the circuit to the winding of the LR relay in the switching control group, Fig. 15, which operates. The circuit is as follows: Ground from a break contact 49 on the SCI relay in the switching control relay group, through a make contact 50 on the LI relay in the switching control relay group operates the LR relay.

The operation of the LR relay removes the "ground in" on line g, from the letter key relay groups and releases all operated relays in these groups. Translation of the letter abbreviation into a stock code number has been accomplished so it is no longer necessary to retain the settings of the letter key relay groups.

"Ground out" GO of the units number key relay group, UP(I), Fig. 10, also supplies "ground in" to the fractions number key relay group, FP(I), over lines 5 and 3 of cable Ca(I), Figs. 10 and 15, and through a break contact 51 on the WO(2) relay in the synchronizing and wipeout relay group, Fig. 15.

The third number key depressed by the operator is recorded in the fractions number key relay group FP (I). "Ground out" on GO of this group supplies "ground in" on GI to the range key relay group, Ra(I).

Figure 14:
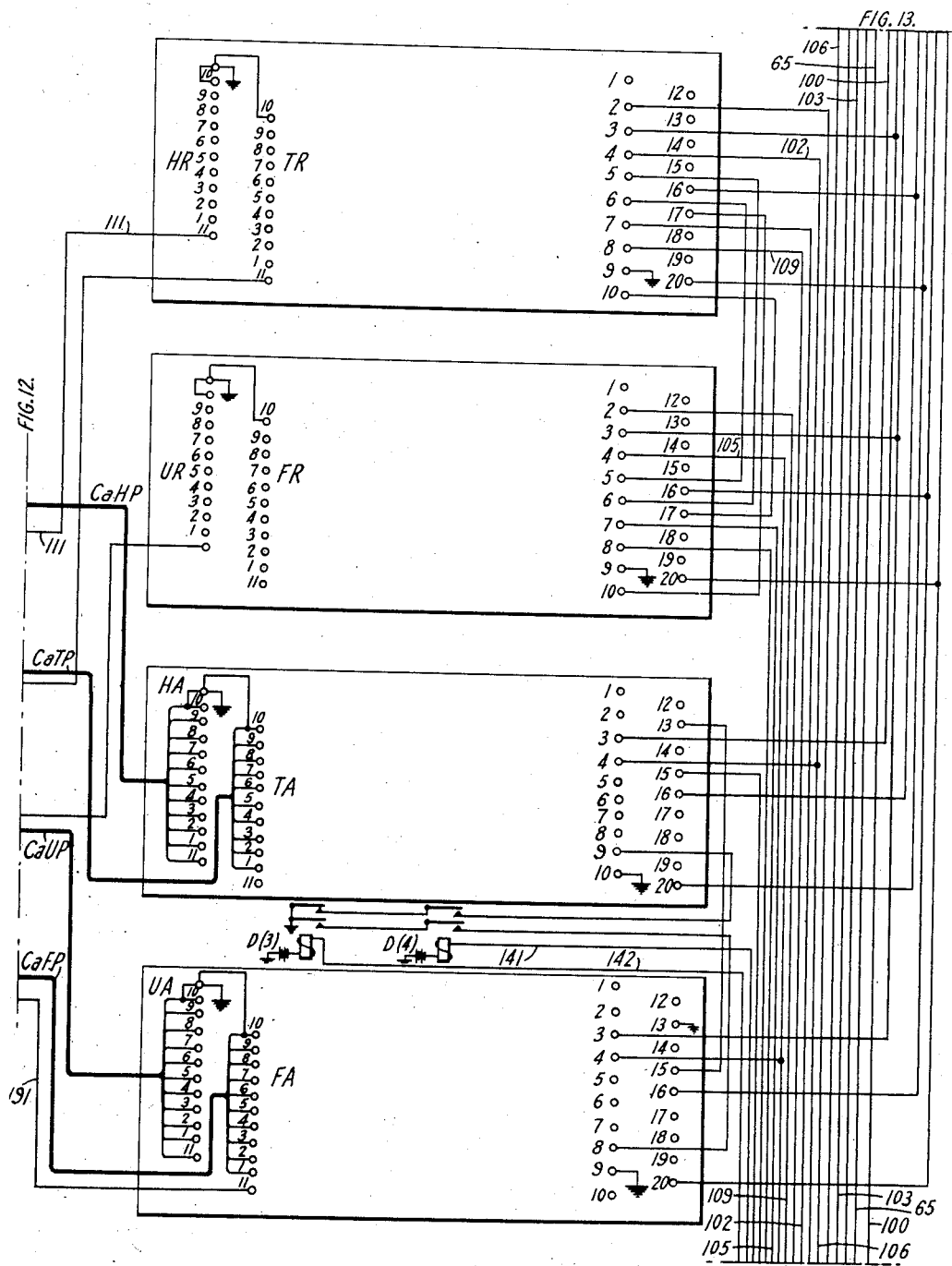
Fig. 14 shows diagrammatically the hundreds, tens, units and fractions price restoration and actuation transmission units, and hundreds, tens, units and fractions price number transmitting units of a second set.

The outgoing leads from the number key relay groups, Figs. 10 and 12, in cables CaHP, CaTP, CaUP and CaFP are directly connected to terminals on the rotary switch banks of the transmission units, HA, TA, UA and FA, Fig. 14, but the key depressions which have been recorded in these groups are not available to the transmission units because the ground supply circuit to the key relay groups has not been closed.

OPERATION OF THE RANGE KEY RELAYS, THE GROUND SUPPLY RELAYS AND THE SWITCHING CONTROL RELAYS

The next key depressed by the operator will be a range key in group V, Fig. 2. This is recorded in the range key relay group, Ra(I), Fig. 10 when the mechanism is in condition to record prices in the number key relay groups in Fig. 10.

When the operator releases the range key, the A relay in the range key relay group, Ra(I), Fig. 10, operates and places a "ground out" on GO line I of Ca(I), Figs. 10 and 15, and line 52 which operates the SCI relay in the switching control relay group, Fig. 15, through a break contact 53 on the SC2 relay in that group. When the SCI relay operates it connects ground over its contact 49 and line 54 to the winding of the GS(I) relay in the ground supply relay group, Fig. 9, which operates. The operation of the GS(I) relay supplies to the stock number relay groups, the number key relay groups and the range key relay group, Fig. 10, the ground which is connected through the contacts on the relays in these groups to one of the outgoing leads in each of them. These grounds on the outgoing leads of the stock number relay groups and the number key relay groups and the range key relay group, Fig. 10, are connected to the proper terminals on the contact banks of the rotary switches in the range, stock number, and actuation transmission units, Figs. 13 and 14.

When the SC(I) relay in the switching control relay group, Fig. 15, operates, it connects ground over its make contact 55 to the winding of the GOC relay which operates at this time. The SC(I) relay remains operated on the "ground out" of the range key relay group. The GOC relay locks up to a ground on its own contact 49 and releases the GO relay in the switching control group. The release of the GO relay at its contacts 36 and 38 transfers the holding ground for the stock number relay groups, Fig. 9, the number key relay groups, and the range key relay group, Fig. 10, from the break contacts on the ER relay to break contacts 56 on the TR relay in the switching control relay group, Fig. 15. Make-before-break contacts on the GO relay are used for this purpose in order that the transfer of the grounds on the stock number relays, the number key relays, and the range key relays may be accomplished without opening the circuit at any time. The transfer of the holding circuits for the relays which must remain operated is necessary at this juncture because, following the depression of a range key, the operator may start to write another quotation, and the ER relay must be available for releasing the storage relays in case an error is made in the second write-up. The transfer of these holding circuits also prevents the release of the stored quotation by the accidental depression of the error key in the keyset after transmission has started. For example, if the error key were unintentionally depressed after the depression of the range key, and the number key relays were held operated on the ER relay, it would be possible to remove the grounds from the transmission unit rotary switches before the actuation units had completed transmission, and ten pulses would be sent over each line in the actuation series.

The release of the GO relay also opens the operating path for the H(1) relay in the switching control group, but the H(1) relay remains locked up on its other winding and its own make contact 42 to ground on break contacts on the TR relay.

The operation of the SC(1) relay also connects ground to the winding of the KL relay in the switching control relay group which operates. The circuit is as follows: Ground from the break contacts 56 on the TR relay in the switching control relay group, Fig. 15, out on line 57 of the switching control relay group, through a make contact 58 on the GS(1) relay in the ground supply group, Fig. 9, over line 59, through a make contact 60 on the SC—1 relay in the switching control relay group, Fig. 15, over line 61, through break contacts 62 on the KLR relay to the winding of the KL relay which operates.

The operation of the KL relay over its make contacts 63 and lines 64 and KL connects battery to the key lock magnet KLM in the operator's key set, Fig. 2, which operates and locks the range keys.

The ground which operates the KL relay in the switching control group also supplies "ground in" to the selection transmission units. The circuit is as follows: Ground from break contacts 56 on the TR relay in the switching control relay group, out on line 57 of the switching control group, Fig. 15, through the make contact 58 on the GS(1) relay, Fig. 9, over line 59, through the make contact 60 on the SC(1) relay in the switching control group, Fig. 15, over line 61 and line 65, through the channeling mechanism, Fig. 16, in case two transmitters are used and thence to jack terminal #8 of the selection transmission units, Fig. 13, or directly to said terminals in case only one transmitter is used. This terminal is "ground in" to the transmission units which now operate.

The H(2), L(2) and SC(2) relays, Fig. 15, function the same as their counterparts H(1), L(1) and SC(1) when the GOC relay is operated.

OPERATION OF THE TRANSMISSION UNITS

*Operation of the selection transmission units*

Figure 13:
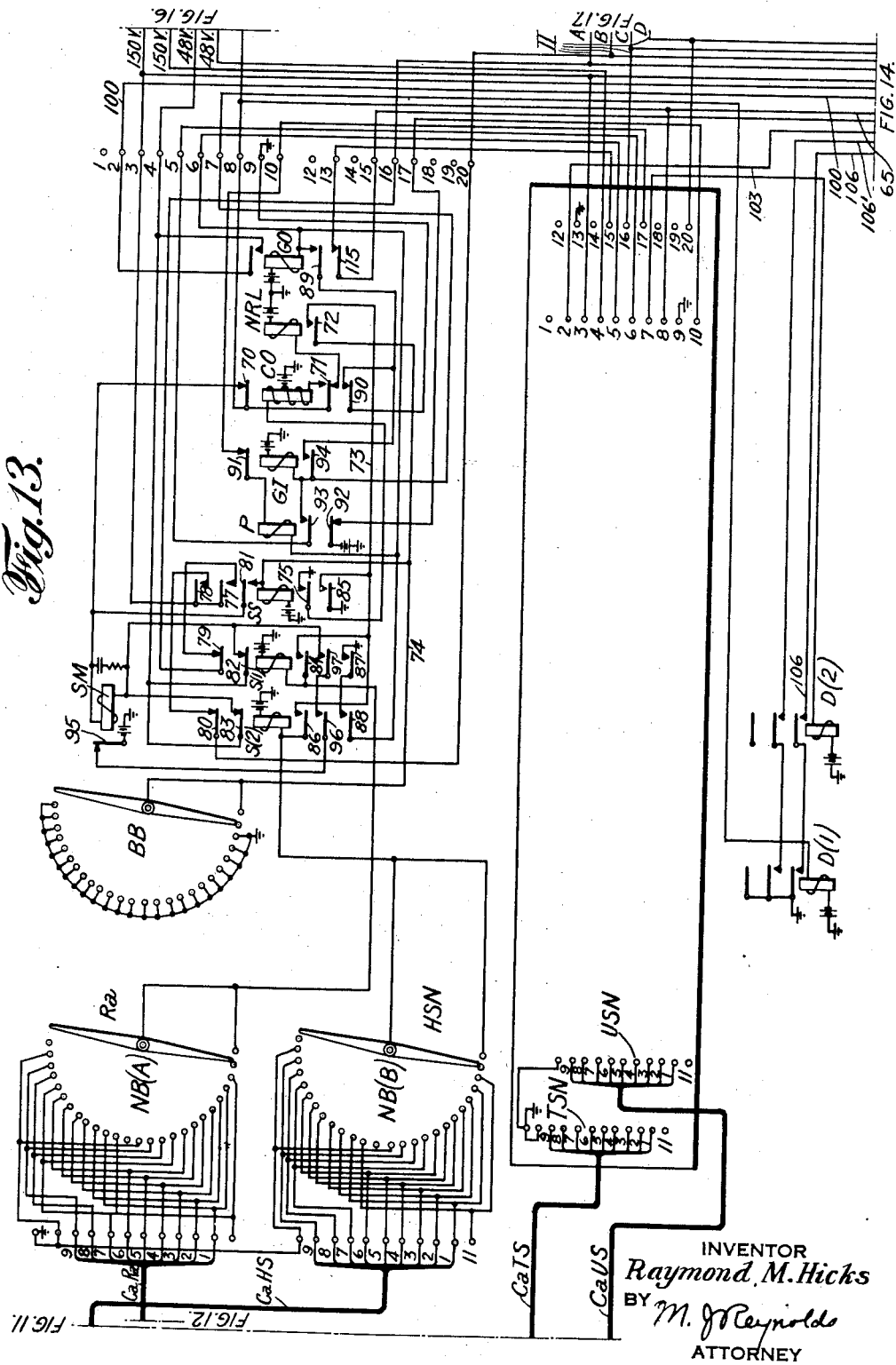
Fig. 13 shows one set of transmitter units for the range, hundreds stock number, tens stock number, and units stock number.

The range and hundreds stock number transmission unit and the tens and units stock number transmission unit, Fig. 13, operate at the same time, and in the same manner. For this reason, the detailed operation of the Ra and HSN transmission unit, Fig. 13, will be explained, and it will be understood that the TSN and USN transmission unit is operating simultaneously in an identical manner.

Before "ground in" is connected to the selection transmission units, no relays in these units are operated, but "ground in" over terminal S, through a break contact 70 on the CO relay starts the operation of the stepper magnet SM of the rotary switch. Forty-eight volt battery pulses are continually available, (see Fig. 16), on jack terminal 4 of the transmission unit, and these pulses are connected through a break contact on the S(1) and S(2) relays in multiple to one side of the winding of the stepper magnet SM of the rotary switches. Since the circuit on the other side of the stepper magnet winding is closed when "ground in" is connected to the transmission unit, the stepper magnet will step once on each pulse until its circuit is broken.

"Ground in" through a break contact 71 on the CO relay operates the NRL relay. The operation of the NRL relay at its contact 72 partially closes the locking circuit of the S(1) and S(2) relays over lines 73 and 74. However, this circuit is not closed until the S(1) and S(2) relays operate. The purpose of this relay will be explained later.

When the bridging bank BB of the rotary switch steps to its first off normal position it connects a ground, which is strapped to all of the contacts on its bridging bank through the wiper, over line 74, to the winding of the SS relay which operates. The SS relay locks up on "ground in" to the transmission unit over contact 70 of relay CO.

When the SS relay operates it connects a ground over its contact 75 to the winding of the CO relay which operates. The CO relay locks up to "ground in" over its contact 71 and opens the circuit to the winding of the NRL relay which releases.

The operation of the SS relay on the first pulse closes the circuit for the 150 volt pulses to the repeater station. The pulses are connected to the repeater station lines A and B, from line 78 over make contacts 77 and 78 and through break contacts 79 and 80 on the S(1) and S(2) relays, so that when these relays operate the pulses are cut off. The range pulses are cut off when the S(1) relay operates and the hundreds stock number pulses when the S(2) relay operates.

When the SS relay operates, it connects over its make contact 81 the grounded side of the stepper magnet winding to the ground on the bridging bank BB of the rotary switch, and the operation of the CO relay immediately following the operation of the SS relay opens the circuit from "ground in" to the stepper magnet SM at its contact 71.

Just before the beginning of the second 48 volt pulse to the stepper magnet of the rotary switch, the transmission unit is in the following condition: The SS relay is operated, the CO relay is operated, the NRL relay has been released, and the stepper magnet is prepared to step from the ground on the bridging bank BB of the rotary switch. The transmission unit continues in this state until a ground is reached on either of the non-bridging banks NB(A) or NB(B) of the rotary switch.

The timing of the 48 volt stepper pulses and the 150 volt line pulses is so arranged that the first 150 volt pulse following the first step of the rotary switch is not transmitted. For each succeeding 48 volt pulse received by the rotary switch, a 150 volt pulse is transmitted over the line.

When a ground is reached on one of the non-bridging banks NB(A) and NB(B) of the rotary switch a connection is made through the wiper of the switch to the winding of either the S(1) or the S(2) relay to operate it. A ground on the NB(A) bank of the switch operates the S(1) relay and a ground on the NB(B) bank operates the S(2) relay. Assume that a ground is encountered by the wiper on the NB(A) contact bank to operate the S(1) relay before the S(2) relay is operated. The operation of the S(1) relay at contact 79 opens the circuit of the 150 volt pulses on the range line A to the repeater station and also at contact 82 opens one of the paths of the stepper pulses to the stepper magnet SM. However, the stepper magnet can continue to step on the stepper pulses through the break contact 83 on the S(2) relay. The S(1) relay at its make contact 84 locks up to a ground on a make contact 85 of the SS relay.

When the ground is reached on the NB(B) non-bridging bank of the rotary switch the S(2) relay operates and cuts off at its contact 80 the 150 volt pulses on the line B for the hundreds stock number leads, to the repeater station. The S(2) relay also at its make contact 86 locks up to a ground on the make contact 85 of the SS relay, and it opens the circuit of the source of stepper pulses to the winding of the stepper magnet SM.

The operation of the S(2) and S(1) relays closes a series circuit from ground over contacts 87 and 88 to the winding of the CO relay which operates and locks up to a ground over its make contact 89 and a make contact 90 of the CO relay. The operation of the CO relay connects the battery pulses to the hundreds and tens restoration transmission unit.

Assuming that the tens and units stock number transmission unit has not completed transmission when the S(1) and S(2) relays in the Ra—HSN unit operates, the P relay in the latter unit will operate. The circuit is as follows: Ground from the make contact 87 on the S(1) relay through the make contact 88 on the S(2) relay, to one side of the winding of the P relay. The other side of the winding is connected through a break contact 91 on the GI relay, out on jack terminal #10 in on jack terminal #17 of the TSN—USN unit, through a break contact 92 on the P relay in the TSN—USN unit to battery.

The operation of the P relay at its make contact 93 partially closes the circuit to the winding of the GI relay, but the GI relay does not operate until the TSN—USN unit completes transmission. The P relay, when it operates, also opens the circuit to the winding of the P relay in the TSN—USN unit.

The Ra—HSN transmission unit remains in this condition until the TSN—USN unit completes transmission. When the S(1) and S(2) relays in the TSN—USN unit operate, a ground is connected to the winding of the GI relay in the Ra—HSN unit, which operates. The circuit is as follows: Ground on a make contact 87 of the S(1) relay in the TSN—USN unit, through a make contact 88 on the S(2) relay, out on jack terminal #6, in on jack terminal #5 of the Ra—HSN unit, through the make contact 93 on the P relay, to the winding of the GI relay, which operates.

The GI relay locks up to a ground over its make contact 94 and the make contact 90 of the CO relay. The ground which operates the GI relay is connected to "ground out" of the Ra—HSN unit on jack terminal #7.

When the GI relay operates, it opens the circuit to the winding of the P relay, which releases. The release of the P relay in the Ra—HSN unit closes the operating path of the P relay in the TSN—USN unit, which operates at this time. The circuit is as follows: Ground on a make contact 87 of the S(1) relay, in the TSN—USN unit, through a make contact 88 on the S(2) relay, to one side of the winding of the P relay. The other side of the winding is connected through a break contact 91 on the GI relay, out on jack terminal #10, in on jack terminal #17 of the Ra—HSN unit, through the break contact 92 on the P relay in that unit to battery.

The operation of the P relay in the tens and units stock number transmission unit operates the GI relay in that unit which in turn releases the P relay. The GI relay in the TSN—USN unit remains locked up to ground on the make contact of the CO relay and connects "ground out" of that unit.

The circuit of the P and GI relays permits delaying the "ground out" of each transmission unit until both units have completed transmission, and gives a definite time delay of 2½ pulses duration between the end of transmission by the selection transmission units and the start of transmission by the restoration units. This delay is necessary to allow the selector cabinets to switch between series of pulses.

When both transmission units have completed transmission, and before the stepping magnet has stepped around to normal the condition of the units is as follows: The SS, CO, GI, S(1), S(2) and GO relays are all operated in both units.

When both the S(1) and S(2) relays have operated the 48 volt pulses to the stepping magnet arm cut off, but the operation of the S(1) and S(2) relays also closes a series path to battery on the break contact of the stepping magnet.

Therefore, when the stepping magnet releases in the no-current interval after the last pulse when the S(1) and S(2) relays are operated, the circuit to its winding is closed through its own break contact. The circuit is as follows: Battery from the break contact 95 of the stepping magnet, through a make contact 96 on the S(2) relay, through a make contact 97 on the S(1) relay, to the winding of the stepping magnet SM. The other side of the winding of the stepping magnet is connected through the make contact 81 on the SS relay, to the wiper on the bridging bank BB of the rotary switch, to ground on the contacts of the bank.

The stepping magnet SM therefore operates through this closed circuit, and when it operates it breaks its own circuit and releases. The magnet continues to step on its own interruptions until it reaches a contact on the bridging bank of the rotary switch which is not connected to ground. This opens the circuit of the stepping magnet and prevents its further operation.

When the rotary switch reaches its normal position and ground is disconnected from the wiper of the bridging bank, the SS relay which was locked up on this ground releases. The release of the SS relay at its contact 85 opens the locking circuit to the S(1) and S(2) relays which release. The CO relay remains operated on "ground in" over jack terminal 8 and the GI and GO relays remain operated on the make contact 90 of the CO relay.

The CO relay must remain operated to prevent "ground in", which originally starts the operation of the stepping magnet, from operating it during the remainder of the quotation while the other two sets of transmission units are being used. The GI relay remains operated to supply "ground out" which becomes the "ground in" to the restoration transmission units. The GO relay must remain operated to direct the stepper pulses for the rotary switches to the proper transmission unit. The GO relay in the Ra—HSN unit connects the pulses out over the jack terminal 2, line 100, Figs. 13, 14 and 15, contact 101 of relay WO(2), line 102, and jack terminal #4 to the HR—TR unit and the operation of the GO relay in the TSN—USN unit connects the pulses over line 103, contact 104 of relay WO(2) and line 105 to the UR—FR transmission unit.

If the switching time between the selection and restoration series of pulses, using only the P and GI relay circuit is not sufficient to allow the selector cabinets to switch and prepare for the next series of pulses, a slightly greater delay between the operation of the selection transmission units and the restoration transmission units may be introduced by two additional relays provided in the "ground out" circuit of the selection units. "Ground out" of the range and hundreds stock number transmission unit operates a relay in the ground supply relay group designated D(1), Fig. 13, and "ground out" of the tens and unit stock number transmission unit operates the relay designated D(2) in this group. When these two relays are operated they connect a series ground through make contacts on each of them to "ground in" to the restoration transmission units. The circuit for HR—TR units is as follows: Ground on the inside contact of the D(1) relay in the ground supply relay group through a make contact on the D(2) relay in the ground supply group, over line 106, Figs. 13, 14 and 15, through a break contact 107 on the SYN(1) relay in the synchronizing and wipeout relay group, through a break contact 108 on the WO(3) relay and line 109 to "ground in" over jack terminal #8 to the HR—TR transmission unit.

The circuit for "ground in" to the UR—FR unit is similar to that for the HR—TR unit.

One 150 volt pulse wire is multipled to the Ra—HSN, HR—TR and HA—TA units, while the other is multipled to the TSN—USN, UR—FR and UA—FA units. The 48 volt pulse wires are arranged to be switched into the transmission units with which the corresponding 150 volt pulse wires are associated.

OPERATION OF THE RESTORATION TRANSMISSION UNITS

The restoration transmission units now operate in exactly the same manner as the selection units operated except that no grounds are placed on the tens, units and fractions rotary switch bank terminals until ten pulses are sent over the lines.

Ground is permanently connected to the tenth terminal on the hundreds, tens, units and fractions non-bridging rotary switch banks of the restoration transmission units, and when the tenth terminal is reached the S(1) and S(2) relays in both units operate and open the 150 volt pulse leads. The relays in the transmission units follow the same sequence of operation as those in the selection transmission units and after the completion of their operating cycle the 48 volt stepper pulses are connected to the actuation transmission units and "ground out" of the restoration units becomes "ground in" for the actuation units and starts their operation.

Since no indicator units are provided in the hundreds position of the "open", "high", "low" and "last" ranges, no pulses are sent over the hundreds line in the restoration series. Ground on a break contact 110 of the HC(1), Fig. 10, relay is connected over line 111, Figs. 10, 12 and 14, to the first terminal of the hundreds bank HR of the rotary switch in the HR—TR unit. The S(1) relay in that unit therefore operates following the first step of the rotary switch and opens the 150 volt pulse circuit to the hundreds line. As explained before, no pulses are transmitted under this condition.

The "ground out" circuit of the restoration transmission unit is similar to that of the selection units in that two relays (designated D—3 and D—4) are provided to secure an additional delay in grounding in to the actuation units. These relays are mounted in the synchronizing and wipeout relay group and operate in exactly the same way as the D(1) and D(2) relays. The circuit for the HA—TA unit is as follows: Ground on the outside make contact of the D(3) relay, through a make contact on the D(4) relay, through a break contact on the WO relay in the synchronizing and wipeout group, to "ground in" for the HA—TA unit.

The circuit for "ground in" to the UA—FA unit is similar to that for the HA—TA unit.

OPERATION OF THE ACTUATION TRANSMISSION UNITS

The operation of the actuation transmission units is exactly similar to the operation of the selection and restoration units.

No pulses are sent over the hundreds line in the actuation series in regular operations during the day. The circuit for accomplishing this is the same as that for the restoration series. See line 11 in cable CaHP, Figs. 10 and 12, grounded over line 112 and break contact 113 of relay HC(1).

The "ground out" circuit of the actuation transmission units is different from that of the other units. The P and GI relay circuit is not utilized, and instead, "ground out" is supplied through a series circuit in both the hundreds and tens actuation, and the units and fraction actuation units. This "ground out" operates the TR relay in the switching control group to release the transmitter. The circuit is as follows: Ground on jack terminal 13 of the UA—FA transmission unit, through a make contact 115 on the GO relay in that unit, out on jack terminal 15 of the UA—FA unit in on jack terminal 13 of the HA—TA transmission unit, through a make contact on the GO relay in that unit, out on jack terminal 15 of the HA—TA unit, in on line 116 of the switching control relay group to the winding of the TR and KLR relays which operate.

The operation of the TR relay in the switching control group opens the circuit and releases the H(1) relay in the switching control group, the operated relays in the stock number relay groups and the number key relay groups, and removes the "ground in" from the selection transmission units releasing those units. Removal of "ground in" to the selection units opens the "ground in" to the other transmission units in a series circuit. When "ground in" is removed from the selection units, the GO relays in those units release, releasing the GI and GO relays. Release of the CO relays opens the "ground out" circuit releasing the D(1) and D(2) relays and removing "ground in" to the restoration units. The release of the restoration units in turn opens the "ground in" to the actuation transmission units, releasing them. The removal of the "ground out" of the actuation transmission units releases the TR and KLR relays in the switching control group.

The SC(1) relay in the switching control group and the GS(1) relay in the ground supply group release when "ground out" is removed from the range key relay group.

The operation of the KLR relay in the switching control group opens the circuit to the KL relay which releases causing the release of the key lock magnet KLM in the operator's keyset permitting the depression of the range key to start the next quotation.

CHANNELING MECHANISM

If two keyboards are used in each half of the dual system, as indicated in Fig. 1, the line 65, Fig. 15, of translator transmitter I is extended over a closed contact 120, Fig. 16, of the channeling relay CR2 to the ground terminal of the channeling relay CR1 causing this relay to be operated and at its contact 121 to supply ground over line 122 to the jack terminals 8 of the Ra—HSN and TSN—USN transmission units, Fig. 13, of the translator transmitter I. The relay CR1 also at its contact 123 opens the line 65' from translator transmitter II and at its contacts 124 and 125 opens the circuit to jack terminals 4 of the Ra—HSN and TSN—USN units in the translator transmitter II.

The interrupter i48 operates continuously to send impulses alternately over the contacts 126 and 127 of relay CR2 and jack terminals 4 of the Ra—HSN and TSN—USN units of I, Fig. 13, to the stepping magnets.

The 150 volt pulses are alternately applied on the jack terminals 3 of the Ra—HSN, HR—TR, HA—FA and the TSN—USN, UR—FR, UA—FA units of both I and II from the 150 volt source, Fig. 16, over interrupter i150, the 150 volt pulses to any unit in either transmitter alternating with the 48 volt pulses as indicated by the relative orientation of the interrupters i48 and i150.

When ground is applied on line 65' of II, Fig. 16, the relay CR2 is pulled up which prevents operation of the relay CR1 and opens up the 48 volt pulse lines to I so that 48 volt pulses will be sent to II. The construction is such that the transmitters may work alternately or each may operate several times in succession, depending on which operator sets up the information. If both operators start by depressing their range keys simultaneously, the one whose quotation is transmitted second cannot again depress a range key until her quotation has been completed.

REPEATERS

The lines A, B, C and D of the transmitter, which are common to a group of master repeating relays (see transmitter in Figs. 13 and 14), lead to a repeater station, Figs. 1 and 17, the repeater mechanism operated by each group of lines A, B, C and D being of the form diagrammatically shown in Fig. 17. Simultaneous impulses on lines A and B energize the pairs of relays AR and BR which over their contacts ar and br ground the energizing circuits of relays A—1, A—2, etc., B—1, B—2, etc., which in turn over their contacts apply plus to lines L2 and L4 which operate polarized relays PL2, PL4 in a series of subscribers' stations, as indicated. The relays AR, BR, CR and DR are arranged in pairs to increase the capacity. The lines A, B, C and D of both I and II are connected to the lines A, B, C and D of the repeater, as indicated in Fig. 13, and each system LB and RF includes a pair of repeaters such as shown in Fig. 17 so that two pairs of lines L2, L4 run to each subscriber to operate the LB and RF teleregister board.

The allotment of lines A, B, C and D during transmission of a quotation is indicated in the following table:

| Lines | Transmission units | | |
|---|---|---|---|
| | Selection | Restoration | Actuation |
| A | Ra | HR | HA |
| B | HSN | TR | TA |
| C | TSN | UR | UA |
| D | USN | FR | FA |

SYNCHRONIZATION

At suitable periodic intervals it is desirable to synchronize the receivers at the subscribers' stations. The receiver cabinets are constructed so that when ten pulses are received as a range indication, a special switching operation takes place which, if the receiver is normal, i. e., ready to receive selection pulses, does not change the condition of the receiver. If the receiver is out of normal, i. e., ready to receive restoration or actuation impulses, the above switching operation will return the receiver circuit to normal. An arrangement of this character is shown in the patent to R. Steeneck 2,034,064 dated March 17, 1936.

These pulses are sent out under control of the SYN key of either keyboard of the respective systems. Depression of the SYN key, Fig. 2, places ground in line SYN, Figs. 2 and 15, to operate the relay SYN. This relay locks to ground over a contact 130 of relay TR. At the contact 131 it closes the circuit for the slow-to-release relay SYN(1). It places ground over the contact 132 on lead 65 which is the "ground in" line to the selection transmission units.

The SYN(1) relay opens up at its contacts 107 and 133 ground out over relays D(1) and D(2), Fig. 13, from the transmission units Ra—HSN and TSN—USN so that the restoration transmission units will not be operated.

The selection switches (Ra—HSN and TSN—USN) when so started, will send out ten pulses on lines A, B, C and D since no control ground has been placed on the rotary switch bank terminals. The ground permanently connected to the eleventh terminal stops the switches after ten pulses have been released.

The SYN(1) relay at its contact 134 closes a circuit over the contacts 115 of the GO relays in the Ra—HSN and TSN—USN transmission units, for the relay TR which releases the relay SYN which removes "ground in" at its contact 132 from the transmission units releasing all the operated relays in said unit.

ERROR KEY

Assume that an error is discovered after the price has been written. Depression of the ERR key, Fig. 2, over line ER, Figs. 2 and 15, pulls up the ER relay which removes ground from the holding line g releasing all registration in the letter key relay groups, which in turn release the first and second letter relays and the stock relays in the translator. Removal of "ground out" from one of the first letter key relay groups, Fig. 3, releases the H(1) or H(2) relay, depending in which group the price is being written. Release of relay H(1) or H(2) normally removes the "ground in" to the respective tens price key relay group, which releases the registration in the units price key relay group and the units in turn releases the fractions price key relay group.

Release of relay H(1) or H(2) removes the locking ground over lines 34 or 35 and lead L, Figs. 9 and 11, releasing the registration in stock number unit 1 or 2

WIPEOUT KEY

The broad purpose of the wipeout key is to restore all the indicators in the receivers by restoration pulses only. The WO' key, Fig. 15, is depressed first to pull up relays WO(1), WO(2) and WO(3). The stock designation is then written, after which the WO key, Fig. 2, is depressed. This places ground on line WO, Figs. 2 and 15, and pulls up the TBS relay, Fig. 5, and also places a ground on range key letter lead K3, Fig. 2, line 10 of cable Ca(1), Figs. 10 and 15, through contact 135 of relay WO(3). The TBS relay translates what has been written and grounds line 1 of cable 24, Figs. 5 and 15, over contact 136 of relay WO(1) and operates the WO relay.

Ground over contact 135 of relay WO(3) is extended over contact 137 of the WO relay to line 9 in Ca(1), Figs. 15 and 10, which is key lead K3 in the range key relay group. "Ground out" of the first letter key relay group is connected over contact 42 of relay H(1) if this is operated, line 43, contact 44 of relay WO(1), to line 2 of cable Ca(1), Figs. 15 and 10, which is ground out of range on line 1 of cable Ca(1), Figs. 10 and 15, pulls up relay SC(1) as usual and starts the transmitter and over contact 138 of relay WO(2) pulls up relay L2 which at its contact operates the LR relay from ground over contact 140 of relay SC(2). Operation of the relay LR releases the translator and associated equipment. The transmitter has been set in operation over line 65 as usual. The range and stock number is now transmitted. "Ground out" from the transmission units over lines 106 and 106', over contacts 107 and 133 of relay SYN(1) and contacts 108 and 108' of relay WO(3), over lines 141 and 142 to operate the D(4) and D(3) relays, Fig. 14, which close through "ground in" to the actuation transmission units which starts the transmission actuation units in the usual manner. As no prices are set up these units send out ten impulses under control of the grounded contact 10, to restore the selected indicators by forward actuation.

The relay TR operates after the transmission of the restoration impulse from the actuation transmission units and at its contact 130 releases the WO relay.

The WO' key when depressed remains in the operated position until released. It is locked in this position during the entire period that stock indicators are to be successively reset to blank position.

HUNDREDS PRICE CONTROL

With the OS key, Fig. 10, in the unoperated position the first price digit written is the tens. The OS key operates the HC(1) relay which at its contact 46 shifts the "ground in" from the tens to the hundreds price key relays, and opens up the hundreds, actuation and restoration lines 112 and 111. The relay HC(1) also shifts the TBS operating ground from "ground out" of tens to "ground out" of hundreds.

AUTOMATIC HUNDREDS PRICE CONTROL

Figure 7:
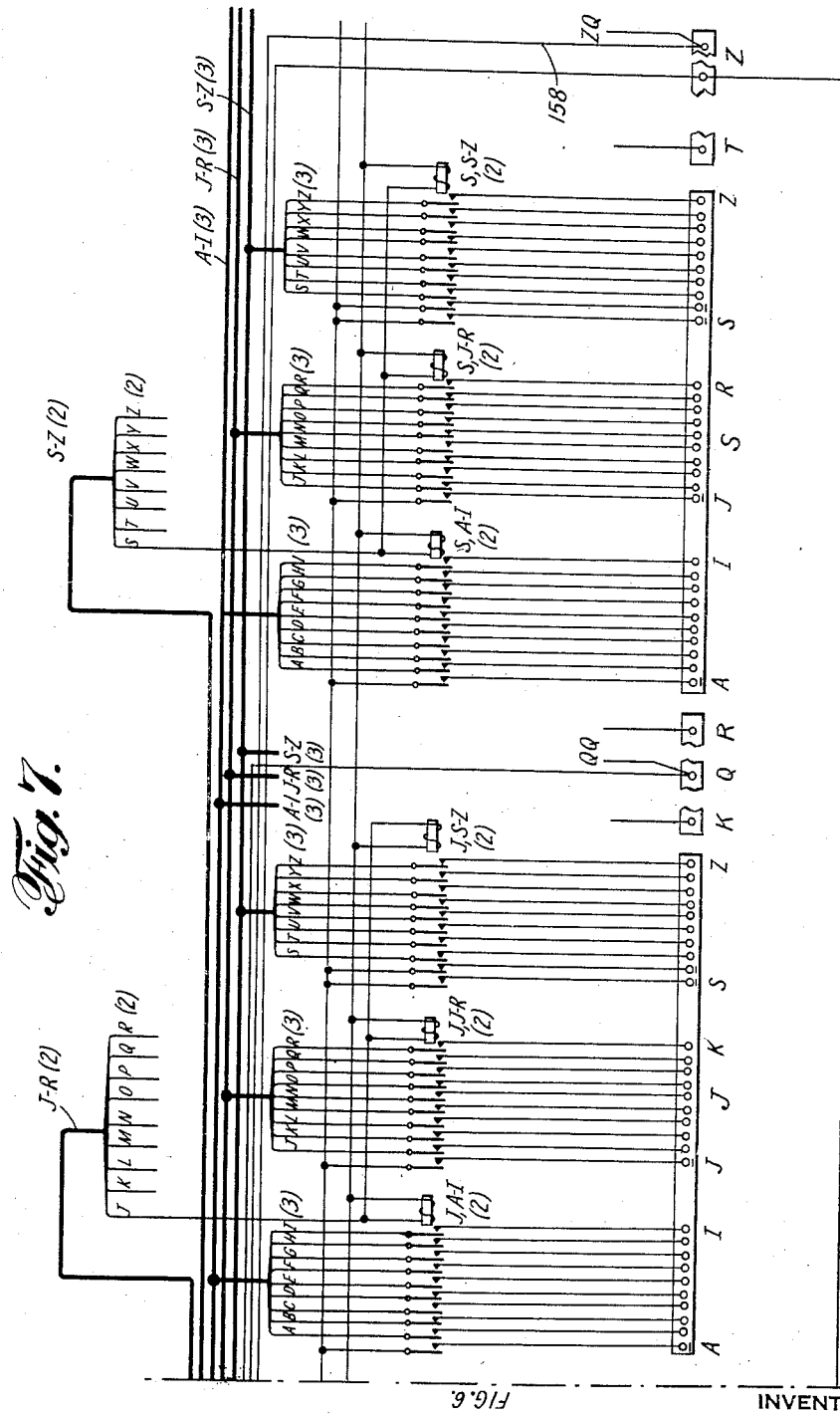

In the case of certain stocks, the hundreds price is always written and for this purpose the HC(1) and HC(2) relays, Fig. 10, are operated over line 150, Figs. 10, 4 and 5, which is connected across an extra contact as for example contact 151 of first letter relay Q, Fig. 5, of a stock whose abbreviation QQQ begins with Q, and over line 152, Figs. 5, 6 and 7, to the QQ terminal on the Q block on which ground is placed by the Q third letter key relay group through the Q contact in the Q second letter relay. As the relay HC(1) is pulled a hundreds price may be written in the HP(1) group and after this is written "ground out" pulls up the TBS relay of the translator.

When the HC(1) and HC(2) relays operate they lock over contact 162 on HC—2 to contact 130 on relay TR, Fig. 15, and remain operated until the quotation has been transmitted.

MINUTES LATE POSTING

A stock relay, for example the one designated YZQ, Fig. 5, may have an extra contact 155 which operates from the FK relay, Fig. 10, for controlling the posting of minutes late of the ticker at any given time. Relay FK at its contacts 156 locks to the TR relay. The time, for example 10:49, may include a hundreds digit. The HC(1) and HC(2) relays are pulled up over line 150, an extra contact 157 of relay Y, Fig. 5, and line 158 from ground on the ZQ terminal of the second letter relays, grounded from the third letter key relay group, over the Q lead. This permits writing of the hundreds digit 1 and the succeeding digits 049.

If the time assumed is 10:50, it is necessary to ground lead K5, Fig. 2, which is required for setting-up a zero and which does not ordinarily lead to the fractions group, Fig. 10. The FK relay at its contact 159 connects the K5 lead to the proper contact on the B relay so that a zero may be written in the fractions position. The time is preferably set up on "yesterday's close" indicators under control of the YCL key.

The number of minutes late is preferaby set up on the "high" indicators. The stock relay YZQ is again selected, the BL key is pressed twice to blank the hundreds and tens, the S key is depressed and then the blank key is depressed. The FK relay at its contact 160 connects the line 11 from jack point 1 which is the 11 or blank lead to line 161 which is connected to contact 11 of the fractions actuation transmission switch permitting the position of blank of an integral indicator used in the fractions position.

While the invention has been described with respect to a certain particular preferred embodiment which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. The combination of a plurality of stock relays corresponding to stocks designated by letters of the alphabet, first letter relays operable to extend circuits to contacts of all stock relays designating stocks having as their first letter the letter corresponding to the operated first letter relay, and means operated by said stock relays for extending said circuits to digit lines for translating the stock abbreviation into a stock number.

2. The combination of a plurality of stock relays corresponding to stocks designated by letters of the alphabet, first letter relays operable to extend circuits to contacts of all stock relays designating stocks having as their first letter the letter corresponding to the operated first letter relay, means operated by said stock relays for extending said circuits to digit lines for translating the stock abbreviation into a stock number, and digit storage devices operated by said circuits over said digit lines.

3. The combination of a plurality of stock relays corresponding to stocks designated by letters of the alphabet, first letter relays operable to extend circuits to contacts of all stock relays designating stocks having as their first letter the letter corresponding to the operated first letter relay, means operated by said stock relays for extending said circuits to digit lines for translating the stock abreviation into a stock number, digit storage devices operated by said circuits over said digit lines, and a transmitter controlled by said storage devices.

4. The combination of stock relays including contacts for closing circuits controlling the transmission of stock selection information, a plurality of first letter relays for applying ground to the contacts of all stock relays relating to stock abbreviations having a corresponding first letter, second and third letter relays operable to prepare circuits to stock relays relating to stock abbreviations having corresponding second and third letters, and means for completing the circuits to all of said latter stock relays.

5. The combination of stock relays, means for applying ground to the contacts of all stock relays relating to stocks having the same first letter, and means for energizing all stock relays having the same second and third letters.

6. The combination of a plurality of sets of relays each including devices for receiving a set-up as to the price and range, means controlling the alternate operation of said sets to receive successive information alternately, transmission mechanism controlled thereby, and means under control of the range group of relays in each set for initiating transmission.

7. The combination of stock relays appropriate to stocks designated by abbreviations of one or more letters, first letter relays for preparing circuits to the contacts of all stock relays of stocks with the same first letter, price relays, means operated upon operation of the price relays for completing one of said circuits over a corresponding single letter stock relay.

8. The combination of mechanism for receiving information as to letters designating a common stock, means for translating the abbreviation of said stock into an arbitrary stock number, a first preferred key and means operable thereby for increasing the value of a digit in the units position of the stock number, and means controlled by said increase in the value of said digit for selecting the first preferred stock corresponding to said common stock.

9. The combination of mechanism for receiving information as to letters designating a common stock, means for controlling the abbreviation of said stock into an arbitrary stock number, and a second preferred key and means operable thereby for increasing the value of the digit in the tens position of the common stock number, and means controlled by said increase in the value of said digit for selecting the second preferred stock corresponding to said common stock.

10. The combination of mechanism for receiving information as to letters designating a common stock, means for translating the abbreviation of said stock into an arbitrary stock number, a preferred key, and means under control of said preferred key for increasing the numerical value of one of the digits of said stock number.

RAYMOND M. HICKS.